(12) United States Patent
Covington et al.

(10) Patent No.: US 11,527,110 B2
(45) Date of Patent: Dec. 13, 2022

(54) VEHICLE HEALTH RECORD

(71) Applicant: Snap-on Incorporated, Kenosha, WI (US)

(72) Inventors: Joshua C. Covington, San Juan Bautista, CA (US); Ozzy Neri, San Jose, CA (US); Patrick S. Merg, Hollister, CA (US); Joshua D. Williamson, San Jose, CA (US); Bradley R. Lewis, Gilroy, CA (US); Brett A. Kelley, San Jose, CA (US); Roy S. Brozovich, Campbell, CA (US); Joseph R. Grammatico, San Jose, CA (US); Jacob G. Foreman, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 376 days.

(21) Appl. No.: 16/541,742

(22) Filed: Aug. 15, 2019

(65) Prior Publication Data
US 2021/0049836 A1 Feb. 18, 2021

(51) Int. Cl.
*G07C 5/00* (2006.01)
*G07C 5/08* (2006.01)
*B60R 16/023* (2006.01)

(52) U.S. Cl.
CPC .......... *G07C 5/006* (2013.01); *B60R 16/0234* (2013.01); *G07C 5/008* (2013.01);
(Continued)

(58) Field of Classification Search
None
See application file for complete search history.

(56) References Cited

U.S. PATENT DOCUMENTS

| 4,847,768 | A | * | 7/1989 | Schwartz | G07C 5/006 |
| | | | | | 701/29.5 |
| 5,382,942 | A | * | 1/1995 | Raffa | F01M 11/10 |
| | | | | | 340/438 |

(Continued)

FOREIGN PATENT DOCUMENTS

| CN | 210300979 U | * | 4/2020 | |
| DE | 102018101002 A1 | * | 7/2018 | G07C 5/006 |

(Continued)

OTHER PUBLICATIONS

International Search Report and Written Opinion for corresponding PCT application No. PCT/US2020/044931 dated Oct. 15, 2020.

*Primary Examiner* — Abdhesh K Jha
(74) *Attorney, Agent, or Firm* — McDonnell Boehnen Hulbert & Berghoff LLP

(57) ABSTRACT

An example method involves receiving, at a computing system, vehicle diagnostic information from a vehicle. The vehicle diagnostic information may include one or more sets of parameters corresponding to parameter identifiers (PIDs). The method further involves identifying a first set of parameters corresponding to a PID representing a state of a particular system of the vehicle and determining, using the first set of parameters, a current value of the PID. The method may also involve performing a comparison between the current value and a predetermined value for the PID and determining a health of the particular system of the vehicle such that the health reflects a difference between the current value and the predetermined value for the PID. The method may also involve displaying, by the computing system at a graphical interface, a vehicle health record representing the health of the particular system of the vehicle.

26 Claims, 19 Drawing Sheets

(52) U.S. Cl.
CPC ........... *G07C 5/085* (2013.01); *G07C 5/0808* (2013.01); *G07C 5/0825* (2013.01); *G07C 2205/02* (2013.01)

(56) References Cited

U.S. PATENT DOCUMENTS

| | | | |
|---|---|---|---|
| 10,208,638 B2* | 2/2019 | Wada | G01N 33/2835 |
| 10,473,009 B2* | 11/2019 | Sworski | G01K 13/02 |
| 10,810,880 B1* | 10/2020 | Schweitzer | G08G 1/096775 |
| 2004/0093150 A1* | 5/2004 | Arai | F01M 11/10 |
| | | | 701/104 |
| 2005/0080606 A1* | 4/2005 | Ampunan | G06Q 10/06 |
| | | | 703/8 |
| 2010/0332073 A1* | 12/2010 | Mathieson | G07C 5/008 |
| | | | 701/29.6 |
| 2012/0042719 A1* | 2/2012 | Schneider | F01M 1/18 |
| | | | 73/114.55 |
| 2013/0103253 A1 | 4/2013 | Thompson | |
| 2013/0204485 A1 | 8/2013 | Chen | |
| 2013/0297142 A1* | 11/2013 | Geng | F01M 1/18 |
| | | | 701/29.5 |
| 2013/0317694 A1* | 11/2013 | Merg | G07C 5/006 |
| | | | 701/31.6 |
| 2014/0025249 A1* | 1/2014 | Giles | B60W 20/50 |
| | | | 701/29.2 |
| 2014/0074344 A1* | 3/2014 | Amirpour | G07C 5/0808 |
| | | | 701/29.6 |
| 2014/0331746 A1* | 11/2014 | Ito | F01M 11/10 |
| | | | 73/53.06 |
| 2018/0238433 A1* | 8/2018 | Syrowik | G01N 33/2888 |
| 2019/0130668 A1* | 5/2019 | Johnson | G07C 5/0808 |
| 2019/0145861 A1 | 5/2019 | Persson | |
| 2019/0156600 A1* | 5/2019 | Potyrailo | G07C 5/0816 |
| 2020/0234252 A1* | 7/2020 | Johnson | G06Q 10/20 |

FOREIGN PATENT DOCUMENTS

| | | | |
|---|---|---|---|
| WO | WO-2007079420 A2 * | 7/2007 | ............ G06Q 10/06 |
| WO | 2018/031721 A1 | 2/2018 | |

* cited by examiner 71 72 73

PID1: 1 – FUEL SYSTEM STATUS
PID2: 2 – CALCULATED ENGINE LOAD
PID3: 3 – ENGINE COOLANT TEMPERATURE
PID4: 4 – SHORT TERM FUEL TRIM – BANK 1
PID5: 5 – LONG TERM FUEL TRIM – BANK 1
PID6: 6 – FUEL PRESSURE
PID7: 7 – INTAKE MANIFOLD ABSOLUTE PRESSURE
PID8: 8 – ENGINE RPM
PID9: 9 – VEHICLE SPEED
PID10: 10 – TIMING ADVANCE
PID11: 11 – INTAKE AIR TEMPERATURE
PID12: 12 – MAF AIR FLOW RATE
PID13: 13 – COMMANDED EGR
PID14: 14 – EGR ERROR
PID15: 15 – FUEL TANK LEVEL INPUT
PID16: 16 – RELATIVE THROTTLE POSITION
PID17: 17 – FUEL TYPE
PID18: 18 – EVAPORATOR SYSTEM VAPOR PRESSURE
PID19: 19 – MASS AIR FLOW SENSOR
PID20: 20 – INTAKE AIR TEMPERATURE SENSOR
PID21: 21 – FUEL INJECTION TIMING
PID22: 22 – ENGINE OIL TEMPERATURE
PID23: 23 – BOOST PRESSURE CONTROL
PID24: 24 – EXHAUST GAS RECIRCULATION TEMPERATURE
PID25: 25 – TURBOCHARGER RPM
PID26: 26 – WASTEGATE CONTROL
PID27: 27 – ENGINE RUN TIME
PID28: 28 – FUEL PRESSURE CONTROL SYSTEM
PID29: 29 – ENGINE PERCENT TORQUE DATA
PID30: 30 – INJECTION PRESSURE CONTROL SYSTEM
PID31: 31 – LF TIRE PRESSURE
PID32: 32 – LR TIRE PRESSURE
PID33: 33 – RF TIRE PRESSURE
PID34: 34 – RR TIRE PRESSURE
PID35: 35 – ENGINE OIL LIFE REMAINING
PID36: 36 – WASHER FLUID LEVEL

FIG. 7    70

Example 1 - 2013 Chevrolet Avalanche 5.3L

| ID | VcsSystem | DataListTitle | PidName | Condition |
|---|---|---|---|---|
| 1 | Antilock Brakes | ABS Data | BRAKE FLUID LEVEL STATUS | Brake Fluid Level |
| 2 | Antilock Brakes | Signal Data | BCM Brake Fluid Level Low Signal | Brake Fluid Level |
| 3 | Instrument Panel Cluster | Data | Brake Fluid | Brake Fluid Level |
| 4 | Instrument Panel Cluster | Data | Brake Fluid Switch | Brake Fluid Level |
| 5 | Instrument Panel Cluster | Data | Washer Fluid Level | Washer Fluid Level |
| 6 | Service Interval Reset | Service Data | ENGINE OIL LIFE REMAINING | Engine Oil Life |
| 7 | Tire Pressure Monitor | TPM DATA | LF Tire Pressure | Tire Pressure |
| 8 | Tire Pressure Monitor | TPM DATA | LR Tire Pressure | Tire Pressure |
| 9 | Tire Pressure Monitor | TPM DATA | RF Tire Pressure | Tire Pressure |
| 10 | Tire Pressure Monitor | TPM DATA | RR Tire Pressure | Tire Pressure |
| 11 | Transmission | Trans Data | ATF Life(%) | Transmission Fluid Level |

| Year | Make | Model | Engine |
|---|---|---|---|
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |
| 2013 | Chevrolet | Avalanche (4WD) | 5.3L V8 SFI (LC9) |

FIG. 13A

| VcsSystem | DataListTitle | PidName | Condition |
|---|---|---|---|
| 1 Antilock Brakes | ABS Data | BRAKE FLUID LEVEL | Brake Fluid Level |
| 2 Instrument Panel Cluster | Data | Brake Fluid | Brake Fluid Level |
| 3 Instrument Panel Cluster | Data | Brake Fluid Switch | Brake Fluid Level |
| 4 Service Interval Reset | Service Data | ENGINE OIL LIFE REMAINING | Engine Oil Life |
| 5 Tire Pressure Monitor | TPM DATA | LF Tire Pressure | Tire Pressure |
| 6 Tire Pressure Monitor | TPM DATA | LF TIRE PRESSURE SENSOR STATUS | Tire Pressure |
| 7 Tire Pressure Monitor | TPM DATA | LR TIRE PRESSURE | Tire Pressure |
| 8 Tire Pressure Monitor | TPM DATA | LR TIRE PRESSURE SENSOR STATUS | Tire Pressure |
| 9 Tire Pressure Monitor | TPM DATA | RF Tire Pressure | Tire Pressure |
| 10 Tire Pressure Monitor | TPM DATA | RF TIRE PRESSURE SENSOR STATUS | Tire Pressure |
| 11 Tire Pressure Monitor | TPM Data | RR Tire Pressure | Tire Pressure |
| 12 Tire Pressure Monitor | TPM Data | RR TIRE PRESSURE SENSOR STATUS | Tire Pressure |
| 13 Instrument Panel Cluster | Data | Washer Fluid Level | Washer Fluid Level |

Example 3 - 2012 Chevrolet Silverado 6.0L

| Year | Make | Model | Engine |
|---|---|---|---|
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |
| 2012 | Chevrolet | Silverado (RWD) | 6.0L V8 Hybrid (LZ1) |

FIG. 13B

VEHICLE HEALTH RECORD

BACKGROUND

Most vehicles are serviced at least once during their useful life. In many instances, a vehicle is serviced at a facility by professional mechanics (e.g., technicians). In other instances, technicians and/or other individuals who are servicing the vehicle can do so at other locations, such as on a shoulder of a city street or highway. When servicing the vehicle, the technician may refer to a repair order including symptom data regarding a vehicle condition (e.g., a perceived malfunction) described by a vehicle owner. In some cases, the repair order is a paper repair order. In other cases, the symptom data of a repair order can be displayed by a display of a computing system.

A technician and/or other individual (hereafter, a user) can use any of a variety of computerized tools and/or non-computerized tools to service (e.g., repair) any of the wide variety of mechanical and/or electronic vehicle components on a vehicle. While servicing a vehicle, a user sometimes needs information for diagnosing and/or repairing the vehicle, and for post-repair activities performed to the repaired vehicle. For example, the user may use a computing system that obtains and displays parameter identifier (PID) parameters from the vehicle under service. The computing system may display PID parameters using a menu with several layers that a user must navigate to be able to display the PID parameters. For example, a computing system may require the user to enter a vehicle year on an initial menu layer, a vehicle make on another menu layer, a vehicle model on another menu layer, an engine identifier on another menu layer, a vehicle system on another menu layer, and a vehicle communication function, such as select PID, on yet another menu layer. In the event the computing system includes an option to display a repair order, the user may need to navigate back to the initial menu layer to be able to access an option to display the repair order.

Although the information presented by the computing system can be helpful when servicing a vehicle, the PID parameters are often displayed by the computing system in an unorganized format that can make it difficult for a user to navigate the available information and clearly understand which systems of the vehicle may require some form of repair. While experienced users may be able to navigate the different menus to access and review the PID parameters associated with specific vehicle systems, there exists a need to simplify the presentation of the vehicle information in a way that clearly associates the PID parameters with vehicle systems such that a user may understand the current health of these vehicle systems.

OVERVIEW

Several example embodiments relate to the development and generation of vehicle health records. A vehicle health record provides information related to the health of various systems of a vehicle in an organized visual format displayable via a graphical user interface (GUI) on a display interface. Particularly, the vehicle health record may use health graphics, such as charts, colors, numerical indications, and other visual graphics to present current health statistics for various vehicle systems in a clearly to understand presentation.

The development of the vehicle health record for a vehicle may initially involve a computing system obtaining vehicle diagnostic information (VDI) from the vehicle and identifying parameters within the VDI that represents the current value for PIDs representative of the health various vehicle systems. The computing system may compare the current value for one or more PID with one or more predefined values for the PID to determine health statistics for the various vehicle systems and compile these health statistics into the vehicle health record for the vehicle. Particularly, the comparison of a PID's current value relative to a predefined value can enable the computing system to determine if the system represented by the PID requires some form of repair (e.g., a rotation, refill, replacement). These determinations for various vehicle systems can be compiled into the vehicle health record, which can then be used for various purposes, including: (i) as a way to view and understand the current health of various vehicle system, (ii) to keep track of the service record for one or more vehicle system over time, and (iii) to provide estimations on when vehicle systems may require some form of attention (e.g., repair, refill, rotation, replacement).

Viewed from one aspect, an example embodiment takes the form of a method comprising receiving, at a computing system, vehicle diagnostic information from a vehicle. The vehicle diagnostic information includes one or more sets of parameters corresponding to parameter identifiers (PIDs). The method further involves identifying a first set of parameters corresponding to a PID representing a state of a particular system of the vehicle. The method also involves determining, using the first set of parameters, a current value of the PID. The method also involves performing a comparison between the current value and a predetermined value for the PID. The method further involves determining a health of the particular system of the vehicle such that the health reflects a difference between the current value and the predetermined value for the PID. The method also involves displaying, by the computing system at a graphical interface, a vehicle health record representing the health of the particular system of the vehicle.

Viewed from yet another aspect, an example embodiment takes the form of a non-transitory computer readable medium having stored therein instructions executable by one or more processors to cause a computing system to perform functions. The functions include receiving vehicle diagnostic information from a vehicle. The vehicle diagnostic information includes one or more sets of parameters corresponding to parameter identifiers (PIDs). The functions also include identifying a first set of parameters corresponding to a PID representing a state of a particular system of the vehicle and determining, using the first set of parameters, a current value of the PID. The functions further include performing a comparison between the current value and a predetermined value for the PID and determining a health of the particular system of the vehicle such that the health reflects a difference between the current value and the predetermined value for the PID. The functions also include displaying, at a graphical interface, a vehicle health record representing the health of the particular system of the vehicle.

Viewed from a further aspect, an example embodiment takes the form of a system. The system comprises a display interface and a computing device. The computing device is configured to receive vehicle diagnostic information from a vehicle. The vehicle diagnostic information includes one or more sets of parameters corresponding to parameter identifiers (PIDs). The computing device is also configured to identify a first set of parameters corresponding to a PID representing a state of a particular system of the vehicle and determine, using the first set of parameters, a current value of the PID. The computing device is also configured to perform a comparison between the current value and a predetermined value for the PID. The computing device is further configured to determine a health of the particular system of the vehicle such that the health reflects a difference between the current value and the predetermined value for the PID. The computing device is also configured to display, at the display interface, a vehicle health record representing the health of the particular system of the vehicle.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 7 shows a PID index in accordance with one or more example embodiments.

FIG. 13A and FIG. 13B illustrate PIDs that can be used to analyze the health of vehicle systems in accordance with one or more example embodiments.

DETAILED DESCRIPTION

I. Introduction

Figure 1:
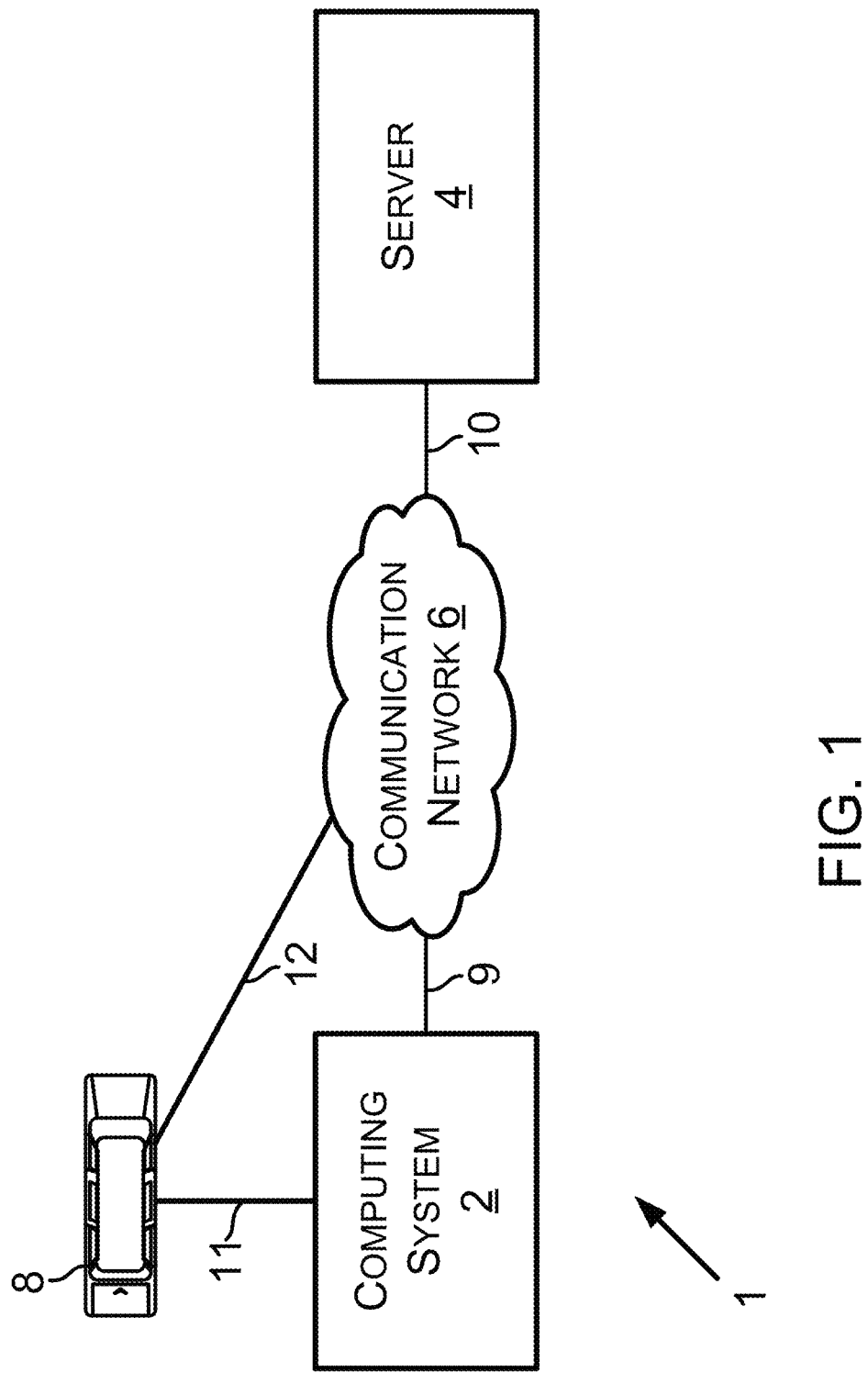
FIG. 1 is a diagram showing an operating environment in which the example embodiments can operate.

This description describes several example embodiments including, but not limited to, example embodiments that pertain to the development and presentation of vehicle health records. As discussed above, a vehicle health record may provide an organized manner of storing and displaying information that depicts the health of various systems of a vehicle (i.e., vehicle systems). The vehicle health record for a particular vehicle may be generated during an initial maintenance of the vehicle and may convey health statistics for various vehicle systems, including which vehicle systems are operating within an optimal range or condition and when certain vehicle systems may require subsequent checking or some form of maintenance (e.g., at a particular mileage on the odometer). Once the vehicle health record is generated for the vehicle, the vehicle health record can be then updated during subsequent servicing of the vehicle in order to maintain a record of the health of the different vehicle systems over time. This way, the vehicle health record may be used to track when particular systems were serviced, how and by whom the systems were serviced, and provide other information that can helps the vehicle's owner maintain the vehicle in good condition overall.

In order to generate a new or update an existing vehicle health record associated with a vehicle, a computing system may initially receive VDI from the vehicle. For example, the computing system may obtain VDI using a wired or wireless connection with the vehicle. In some instances, the computing system may obtain the VDI during a maintenance check or servicing of the vehicle. Although a computing system is described as performing the various operations described herein to develop and display a vehicle health record, these operations may be performed by multiple computing systems within some examples. For instance, a computing system may obtain VDI from a vehicle and communicate the VDI to a server that performs one or more operations described for developing the vehicle health record. As such, the computing system is described herein as performing the operations for illustration purposes.

Once the computing system obtains VDI from the vehicle, the computing system may analyze the VDI to identify parameters that indicate the current values for PIDs representative of the health of various vehicle systems. These PIDS may include one or more vehicle condition PIDs (VCPs), which are a particular type of PID configured to convey a current health-related attribute for a vehicle system. For instance, a VCP may pertain to a consumable associated with a vehicle system, such as a fluid level used by a system (e.g., engine oil, windshield washer fluid), a level of brake pad wear, or an indication of the oil life of the engine, etc. As such, a VCP may indicate an attribute level for a vehicle system that depletes as a result of use over time (e.g., washer fluid decreases with each use). Some VCPs can represent one or more values on a multi-point inspection, such as a fluid level, a level of brake pad wear, an oil life, a tire pressure, a status of the battery, or a trailer bulb out signal, etc. As such, example embodiments described herein may involve using a set of PIDs to determine the health of vehicle systems that include one or more VCPs. The computing system may include a module that can map information to identify VCPs within PIDs. In some instances, a VCP may include identifying information that indicates that the VCP represents an aspect of vehicle health for the computing system to utilize. In some embodiments, a computing system may obtain information related to dozens, hundreds, or even thousands of health-related PIDs.

In some embodiments, a PID may include a tag that indicates that the PID represents health-related information. As such, a computing system may identify these PIDs based on the tags. In other embodiments, a computing system may be configured to determine which PIDs convey vehicle system health-related information.

Parameters identified within VDI received from the vehicle can be used to determine the current value of a PID. In particular, a PID's current value may represent information regarding the current condition of a vehicle system associated with the PID. For instance, the PID's current value may indicate a current condition of a brake pad or another vehicle system, the fluid level of windshield washer, an oil level of the oil system, a battery voltage, or another health-related aspect of a vehicle system. As such, the particular health-related information conveyed by a PID's current value can depend on the type of vehicle system.

Although the PID's current value can convey some information related to the health of a system, the computing system may utilize a comparison process to determine whether or not the PID's current value indicates that the vehicle system is currently healthy (e.g., the vehicle system is operating within an optimal range) or the vehicle system requires some form of maintenance. More specifically, the comparison of the PID's current value to one or more predefined values can enable the computing system to determine: (i) if the current condition of the associated vehicle system indicates that the vehicle system requires maintenance, (ii) if the vehicle system does not require immediate maintenance, an estimation of when the vehicle system should be checked again (e.g., at a particular mileage on the odometer or another indication), or (iii) the vehicle system is in good health and likely does not require maintenance for a substantial amount of time (e.g., not a priority for checking during servicing). The predefined values used to compare to the PID's current value may represent thresholds or other historical reference points that serve as benchmarks for evaluating the vehicle system's health. Each health evaluation of a vehicle system can be then compiled into the vehicle health record for the vehicle to develop an overall presentation of information that can be used to understand which vehicle systems may require some form of maintenance.

The predefined value or values used to critique a PID's current value to evaluate the health of an associated vehicle system may vary within examples. In some instances, a predefined value may correspond to a threshold that can serve to assist the computing system determine whether a PID's current value is within a healthy range (i.e., an optimal range for operation). If a comparison yields that the PID's current value breaches the threshold, this may serve as an indication that the vehicle system associated with the PID requires some form of review or maintenance. Likewise, multiple predefined values can be used to evaluate a PID's current value to determine if a vehicle system requires maintenance.

In addition, the predefined value or values used within a comparison may depend on different factors, such as the type of vehicle system being analyzed, the quantity of miles on the odometer of the vehicle or the miles driven since the last maintenance on the system, set during a prior maintenance of the system, and a value set by the manufacturer of the vehicle or the system. One or more of these factors may be used to derive one or more predefined values for comparing with the current value of the PID representing the current state of the vehicle system.

In an example embodiment, the computing system may analyze a PID's current value relative to a single predefined value (e.g., a single predefined threshold). Such a comparison may yield binary results for the health of the vehicle system undergoing analysis. For instance, the computing system may determine that the vehicle system is operating within a healthy range unless the PID's current value breaches the single predefined value. To illustrate an example, the computing system may use a single threshold when analyzing the fluid level of the windshield washer or a similar fluid system. In particular, when the fluid level associated with the system drops below a certain amount (i.e., the predefined threshold amount), the computing system may determine that the fluid level is not within an optimal range for the system and requires maintenance (i.e., a refill of the fluid). As a result, the computing system may include some type of maintenance alert for the particular system that indicates a refill is needed within the vehicle health record for the vehicle. For instance, the maintenance alert may include text, a color, or some other signal that alerts the user that the fluid level requires a refill.

In another embodiment, the computing system may analyze a PID's current value relative to multiple predefined values. For example, the PID's current value may be compared to a lower threshold and an upper threshold that together define an optimal range of operation for the particular vehicle system. To illustrate an example, the computing system may compare the pressure level of a tire relative to an upper threshold and a lower threshold. When the comparison indicates that the pressure level of the tire falls outside the range set by the thresholds, the computing system may include an indication within the vehicle health record that specifies for maintenance of the tire. For instance, the indication may include text, use colors, graphs, or some other presentation to show the user that the tire is outside the optimal tire pressure range. As such, the computing system may perform this process for each tire to provide a complete analysis of tire pressures of the vehicle within the vehicle health record.

In yet another embodiment, the computing system may analyze the PID's current value relative to a set of predefined values. For instance, the computing system may compare the PID's current value to a scale of values that indicates the health of the associated vehicle system based on where the PID's current values falls on the scale. For instance, the computing system may compare a current voltage of the battery relative to a scale of voltage values. The computing system may determine the health of the battery based on where the current voltage falls on the scale and include an indication of the health relative to the scale on the vehicle health record. In the vehicle health record, the computing system may display the current voltage of the battery and indicate whether or not this current voltage is acceptable for operation of the vehicle.

In addition, the computing system may analyze multiple PIDs to determine the health for some types of vehicle systems. For instance, an analysis of the health of the vehicle's engine may involve analyzing a first PID related to the oil level of the engine and a second PID related to the recent mileage imposed on the engine. As such, the analysis of multiple PIDs may enable the computing system to determine whether or not a particular vehicle system requires maintenance.

When generating a new vehicle health record or updating an existing health record, the computing system may use the PID analysis to convey health statistics regarding various vehicle systems in a visual format displayable on a display interface. Particularly, the vehicle health record may be conveyed using a GUI that includes vehicle graphics, text, graphs, colors, and other representations to convey the health of various vehicle systems. For some vehicle systems, the comparison of a PID's current value with one or more predefined values may yield binary health results (i.e., the vehicle system is either healthy or requires some form of maintenance). As such, the vehicle health record may be generated to reflect whether these vehicle systems are healthy or require some form of maintenance. For other vehicle systems, the comparison may yield a health result that indicates a current condition of the vehicle system in some statistical form. As an example, the health of vehicle brakes may be determined based on a percentage scale 0-100 percent with "0" percent representing new brake pads required immediately and "100" percent representing brand new brake pads. Thus, for these systems, the vehicle health record may be generated to represent the health of these vehicle systems using the statistical form. As such, the computing system may be configured to analyze each vehicle system based on particular analysis factors specific to that type of vehicle system in order to generate the vehicle health record.

To compile the vehicle health record that conveys the health of multiple vehicle systems, the computing system may perform the health analysis process iteratively for multiple PIDs related to various vehicle systems. This way, the computing system may develop health statistics for numerous vehicle systems. In some examples, the computing system may be configured to perform the health analysis of vehicle systems according to a predefined process. For instance, the computing system may analyze two PIDs related to the engine system, then two PIDs related to the brake system, and then four PIDs from the tire pressure monitoring system (TPMS).

As indicated above, the computing system may compile the health statistics determined for the various vehicle systems to generate (or update) a vehicle health record that organizes the determined health statistics in a visual format. Particularly, the health statistics derived from evaluating VCPs and other PIDs can be displayed in an organized format using a one or more GUIs. The GUI may include various health graphics that convey the health of the various vehicle systems, including indications of whether or not a vehicle system may require maintenance. The different elements of the GUI may be selectable via a user interface to enable the user to navigate the health related information in an efficient and compact manner. In addition, screen shots of one or more GUIs can be printed to enable a user to review the vehicle health record in a paper format. Some example vehicle health record GUI's are described below. Additional configurations are possible.

In an example embodiment, the vehicle health record may use a vehicle graphic. Particularly, the vehicle graphic may be an outline of a vehicle, which may or may not correspond to the type of vehicle being analyzed for the vehicle health record. As such, the vehicle health record may use the vehicle graphic as a visual base to locate other vehicle health graphics related to particular vehicle systems. This way, vehicle health graphics for individual systems can be located relative to the vehicle graphic at locations that correspond to the actual locations of the systems on the vehicle. As an example, the vehicle graphic may include tire health graphics for each wheel that indicate the current pressure within the tire and the condition of the brake pad positioned relative to the tire. The vehicle graphic may also include an engine health graphic that indicates a current health of the engine. These example graphics are described for illustration purposes, but other potential health graphics are possible within examples.

A vehicle health record can be stored in an organized manner for subsequent access and modification. This way, the vehicle health record can be updated to reflect changes in the health of vehicle systems as the vehicle is further driven. The computing system may store the vehicle health record locally or remotely (e.g., at a server) with information that associates the record with the particular vehicle (e.g., an account for the vehicle). As a result, the computing system or other computing systems may access the vehicle health record during a subsequent servicing of the vehicle. In addition, the vehicle health record may be made available online for access by the owner of the vehicle or other potential users. This may involve using a password protection feature to ensure that limited access is available to protect the security of the vehicle health record. By storing the vehicle health record and making it available via wireless communication, the vehicle can be serviced at various locations with the vehicle health record being updated accordingly. As a result, the vehicle health record may represent a compilation of multiple services enabling a user to review system health over time for the vehicle. For instance, the vehicle health record may indicate when each system was last serviced.

Some embodiments may further involve using data from numerous vehicle health records to identify trends and other information that can help with maintenance of vehicles. Particularly, one or more computing systems may analyze data from vehicle health records accumulated from similar vehicles (e.g., the same year, make, and model) to determine trends in the health statistics, such as at what mileage do certain systems require maintenance. Using this process, the computing system(s) may develop a database of predefined values that can be used when analyzing the health of vehicle systems. In some instances, the predefined values may be based on trends identified specific to the type of vehicle system or specific to the type of vehicle. In some examples, these trends can be used to help express when a vehicle system may require servicing. In turn, a technician may use the trend information and a vehicle health record to help increase visibility for services that the technician may offer. For instance, a technician may use the trends and a vehicle health record to express which systems may benefit from some form of preventative repair or replacement to avoid potential larger costs down the road for the vehicle owner.

In some examples, a computing system may organize PIDs into different categories that can increase a user's understanding of a vehicle health record. Some example categories include automatic transmission life, battery life, brake lining and rotor wear, camera faults, coolant levels and temperature, diesel exhaust fluid level and quality, engine oil level and life, fuel filter life and quality, gear oil life, lidar and radar fault, lighting fault, service time and distance until next servicing, specific component faults, tire pressure and sensor battery life, and warning indicator based. PIDs related to each category may be grouped according to the particular system that the PID represents.

II. Example Systems

FIG. 1 is a diagram showing an example operating environment 1 in which the example embodiments can operate. As shown, the operating environment 1 includes a computing system 2, a server 4, a communication network 6, a vehicle 8, and communication links 9, 10, 11, 12, but may include more or fewer elements within other example embodiments.

The computing system 2 can take various forms, such as a specialty computing system specifically configured in whole or in part for the purpose of servicing vehicles (e.g., the vehicle 8). In some instances, a specialty computing system can include unique elements for facilitating servicing of vehicles or can otherwise be uniquely configured in such a way that distinguishes the specialty computing from another type of computing system. In some examples, a specialty computing system can be configured to perform various functions associated with servicing vehicles, can include communication interfaces with other systems/servers/networks associated with servicing vehicles, and can be configured to send and receive data over those interfaces in accordance with one or more protocols associated with servicing vehicles. Alternatively, in some examples, the computing system 2 can be a general purpose, non-specialty computing system, such as a general purpose smart phone, desktop computer, laptop computer, or the like. As a general matter, the computing system 2—specialty or general purpose—can take the form of a hand-held device, laptop computer, desktop computer, and/or another type of device.

The operating environment 1 further includes the server 4 connected to the computing system 2 via the communication network 6. As such, the server 4 can take various forms as well, such as a specialty server specifically/uniquely configured for the purpose of servicing vehicles, or a general-purpose server. In some examples, the server 4 can be scaled so as to be able to serve any number of devices, such as one computing system (as shown in FIG. 1), one hundred computing systems, one thousand computing systems, or some other number of computing systems.

The communication network 6 can include the communication links 9, 10, 11, 12 as well as other communication links (not shown in FIG. 1). The communication network 6 and the communication links 9, 10, 11, 12 can include various network elements such as switches, modems, gateways, antennas, cables, transmitters, and receivers. The communication network 6 can comprise a wide area network (WAN) that can carry data using packet-switched and/or circuit-switched technologies. The WAN can include an air interface and/or wire to carry the data. The communication network 6 can comprise a network or at least a portion of a network that carries out communications using a Transmission Control Protocol (TCP) and the Internet Protocol (IP), such as the communication network commonly referred to as the Internet. Additionally or alternatively, the communication network can comprise a local area network (LAN), private or otherwise.

The operating environment 1 further includes the vehicle 8 shown in communication with the computing system 2 and the communication network 6. A vehicle, such as vehicle 8, is a mobile machine that can be used to transport a person, people, and/or cargo. As an example, any vehicle described herein can be driven and/or otherwise guided along a path (e.g., a paved road or otherwise) on land, in water, in the air, and/or outer space. As another example, any vehicle described herein can be wheeled, tracked, railed, and/or skied. As yet another example, any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, and/or a farm machine.

As an example embodiment, the vehicle 8 can be guided along a path and can include a van (such as a dry or refrigerated van), a tank trailer, a platform trailer, or an automobile carrier. As still yet another example, any vehicle discussed herein can include or use any appropriate voltage or current source, such as a battery, an alternator, a fuel cell, and the like, providing any appropriate current or voltage, such as about 12 volts, about 42 volts, and the like. As still yet another example, any vehicle discussed herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle discussed herein can include an electronic control unit (ECU), a data link connector (DLC) (i.e., an on-board diagnostic connector), and a vehicle communication link that connects the DLC to the ECU.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (e.g., a four cylinder internal combustion engine) within the vehicle. A person skilled in the art will understand that other features in addition to or as an alternative to "engine type" can be used to identify a vehicle using particular vehicle identifying information. These other features can be identified in various manners, such as a regular production option (RPO) code, such as the RPO codes defined by the General Motors Company LLC, Detroit Mich.

A vehicle communication link within a vehicle (e.g., the vehicle 8) can include one or more conductors (e.g., copper wire conductors) or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle. The computing system 2 or another computing system can include a vehicle communication transceiver 25 connectable to a vehicle communication link and a processor to transmit and receive vehicle communications via the vehicle communication link.

As indicated above, any vehicle described herein can include an electronic control unit (ECU), a data link connector (DLC), and a vehicle communication link that connects the DLC to the ECU. An ECU can control various aspects of vehicle operation or components within a vehicle. For example, the ECU can include a powertrain (PT) system ECU, an engine control module (ECM) ECU, a supplemental inflatable restraint (SIR) system (e.g., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. Performance of a functional test can or a reset procedure with respect to an ECU can comprise the computing system 2 transmitting a VDM to a vehicle. A VDM received by an ECU can comprise a PID request. A VDM transmitted by an ECU can comprise a response comprising the PID and a PID data value for the PID.

The DLC can include an on-board diagnostic (OBD) II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Aptiv LLC of Dublin, Ireland. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication link such that the DLC is communicatively connected to the ECU.

The computing system 2 and/or the vehicle 8 can be located at the same location as one another or remotely from one another at separate, distinct locations. For example, both the computing system 2 and the vehicle 8 can be located at a repair shop. As another example, both the computing system 2 and the vehicle 8 can be located out on the road. As yet another example, the computing system 2 can be located at a repair shop and the vehicle 8 can be located out on the road. One or more of these locations can also include various computerized shop tools (CSTs) and/or non-computerized shop tools, such as a battery charger, torque wrench, brake lathe, fuel pressure gauge, wheel balancer, etc. Further, one or more of the shop tools and/or the computing system 2 can be operable outside of a repair shop. For example, the computing system 2 can be operable within the vehicle 8 as the vehicle 8 is driven on roads outside of the repair shop for any of a variety of purposes.

The vehicle 8 can transmit various data to the computing system 2, such as OBD data (e.g., diagnostic trouble codes (DTCs), measurements read by a shop tool from a VDM, real-time and/or non-real-time electrical measurements (e.g., sensor readings), VDI, and/or other types of data. For example, the vehicle 8 can transmit data directly to the computing system 2 over communication link 11. As another example, the vehicle 8 can transmit data indirectly to the computing system 2 by transmitting the data over communication link 12, communication network 6, and communication link 10 to the server 4, after which the server 4 can transmit the data over communication link 10, communication network 6, and communication link 9 to the computing system 2. The vehicle 8 can perform such an indirect transmission of data with or without specifying the computing system 2 as a destination for the data. For instance, the vehicle 8 (and perhaps other vehicles in communication with the server 4) can transmit data to the server 4, specifying the server 4 as the destination for the data. Thereafter, the computing system 2 can transmit to the server 4 a request for the data, the server 4 can assemble the data and transmit the data to the computing system 2 in response to the request.

The computing system 2, the server 4, and/or the vehicle 8 can transmit data to (and receive data from) other devices on the communication network 6 as well, such as one or more databases (not shown) to which the computing system 2, the server 4, and/or the vehicle 8 have access.

For any given computer system discussed herein, such as the computing system 2, the server 4, and/or the vehicle 8, data received by that device can be stored within a computer-readable medium for use by that device. Further, for any given computer system discussed herein, such as the computing system 2, the server 4, and/or the vehicle 8, data received by that device can be stored locally in memory at that device and/or can be stored remotely at a storage location accessible by that device (e.g., a remote server or remote database).

One or more computing systems and/or one or more vehicles can be connected by a network established by those devices, such as a vehicle-to-client network, or the like. Such a network can comprise a personal area network (PAN). The PAN can be configured according to any of a variety of standards, protocols, and/or specifications. For example, the PAN can be configured according to a universal serial bus (USB) specification 2.0, 3.0, or 3.1 developed by the USB Implementers Forum. As another example, the PAN can be configured according to an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15, 3, 802.15.4, or 802.15.5) for wireless PAN.

In example operating environment 1, there can be a scenario in which the computing system 2 transmits to the server 4 a request for a download of information (e.g., information associated with a vehicle component for a particular vehicle). Such a request can include, for example, a YMM of a particular vehicle and a name of a particular vehicle component. As another example, the request can include a YMME of a particular vehicle and an indication (e.g., a description or code) of a particular symptom associated with a particular vehicle component. As yet another example, the request can include data received from the vehicle for which the information is being requested, and such data can include a vehicle identification number (VIN) of the vehicle, a DTC indicative of a particular vehicle component of the vehicle, an image of a particular vehicle component, among other possibilities.

In this scenario, upon receipt of the request, the server 4 can assemble the download. For instance, upon receipt of the request, the server 4 can retrieve some or all of the computing system-requested information from memory at the server 4. Additionally or alternatively, upon receipt of the request, the server 4 can in turn transmit a request to one or more databases located remotely from the server 4 for some or all of the computing system-requested information and then receive some or all of the computing system-requested information from the one or more databases. Upon assembling the download including the computing system-requested information, the server 4 can transmit the download to the computing system 2.

Figure 2:
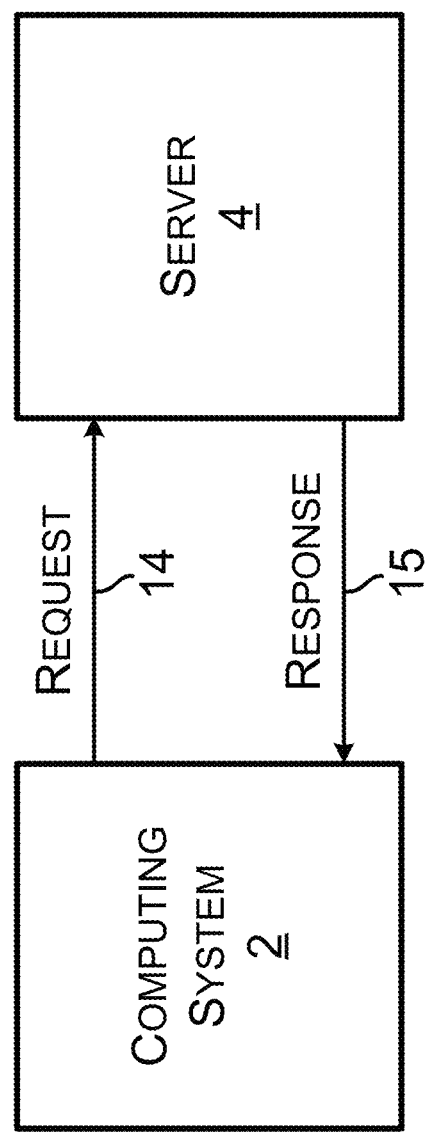
FIG. 2 is a communication flow diagram in accordance with one or more example embodiments.

Next, FIG. 2 illustrates an example communication workflow between a computing system and a server. More specifically, the computing system 2 may communicate with the server 4 to assist a user with the servicing of the vehicle 8. For instance, the computing system 2 may send a request 14 over a communication network (e.g., the communication network 6) to the server 4. The request 14 may include information describing the vehicle 8 (e.g., a YMM or a YMME) and related to operation of the vehicle 8 (e.g., symptoms, VDI). Upon receiving the request 14, the server 4 may transmit a response 15 to the request 14 back to the computing system 2. The response may include various information that the computing system 2 may utilize, such as one or more predefined values for analysis of health of various vehicle systems. For example, the server 4 may transmit a threshold, multiple thresholds, or other information related to one or more PIDs that correspond to the vehicle 8.

As such, the response 15 to the request 14 provided by the server 4 may allow the computing system 2 to display contextually relevant pieces of data or information about the vehicle 8, such as vehicle data parameter (VDP) graphs indicative of various PIDs, a list of PIDs, or a test to perform to service a vehicle with respect to a PID that breached a PID threshold. The list of PIDs can include an indexed list of PIDs applicable to the vehicle and operation of the vehicle described in the request 14. The VDP graphs provided in the response 15 can be based on PIDs that the computing system 2 provided to the server 4 before transmission of the request 14. The test within the response 15 can include one or more tests. The one or more tests can include a test within an indexed list of tests, such as an indexed list of component tests, an indexed list of functional tests, or an indexed list of reset procedures.

In some examples, the computing system 2 may provide a request 14 for information related to the health of the vehicle 8. For instance, the computing system 2 may request 14 for a vehicle health record associated with the vehicle 8. The computing system 2 may provide an account reference number or another indication associated with the vehicle 8 to the server 4. In response, the server 4 may provide the vehicle health record associated with the vehicle 8 to the computing system 2. Similarly, the computing system 2 may request 14 for a vehicle health record for the vehicle 8 from the server 4 that corresponds to multiple vehicle health records complied together. In addition, the computing system 2 may also transfer vehicle health records to other computing systems through the server 4.

In an example embodiment, the computing system 2 may obtain one or more predefined values for analyzing the current value of PIDs associated with the vehicle 8. For instance, the computing system 2 may obtain predefined values specific to the vehicle 8 that were stored by the server 4. In other instances, the server 4 may provide predefined values based on the YMM of the vehicle 8, the manufacturer of specific vehicle systems associated with the vehicle 8, or based on trends detected from analyzing vehicle health records for vehicles similar to the vehicle 8.

Figure 3:
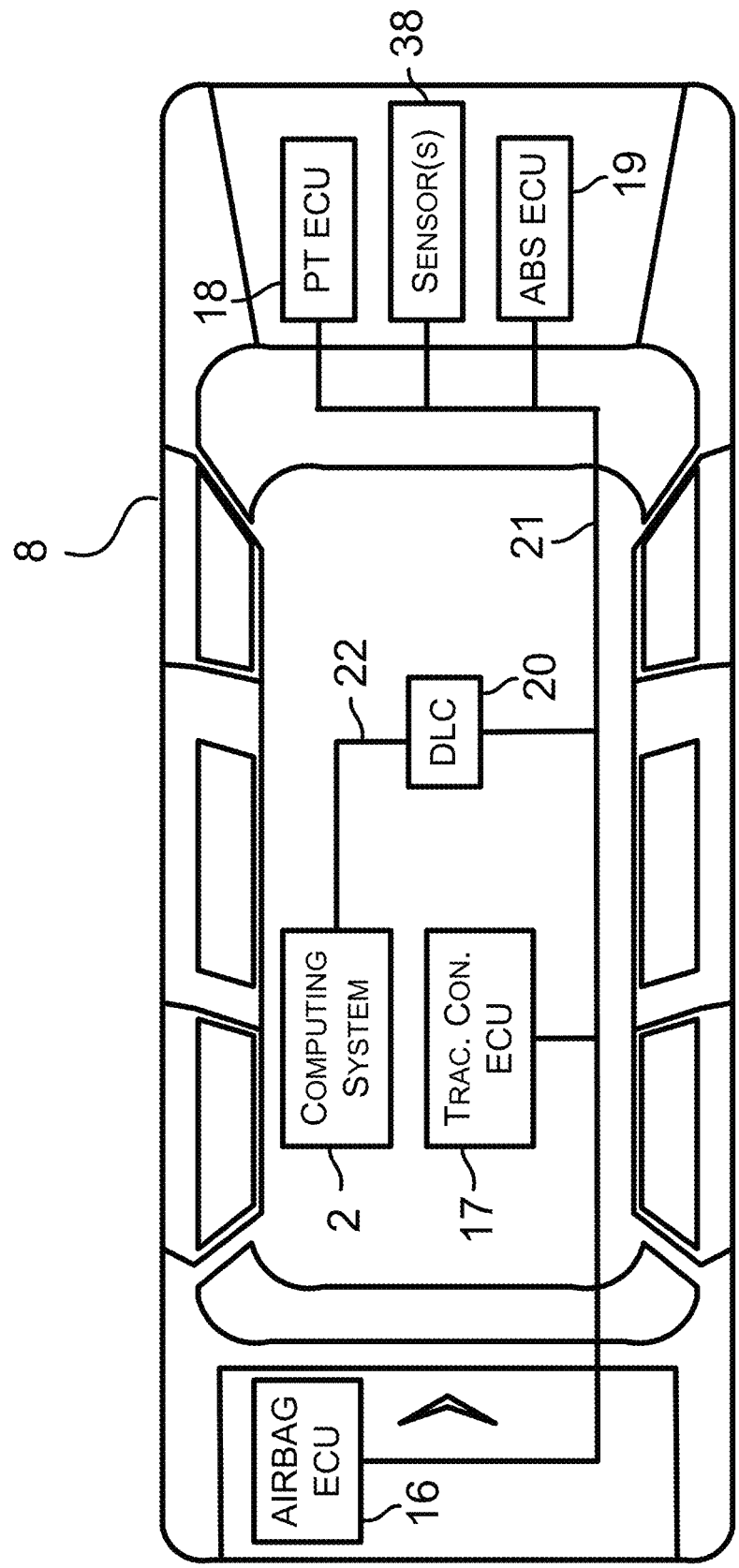
FIG. 3 is a diagram of a vehicle showing placement of a computing system in accordance with one or more example embodiments.

Next, FIG. 3 shows example details of the vehicle 8 and example placement of the computing system 2 within the vehicle 8. Particularly, the vehicle 8 is shown with an airbag system ECU 16, a traction control system ECU 17, a powertrain system (PT) ECU 18, an antilock brake system (ABS) ECU 19, a DLC 20, and sensor(s) 38 each of which is connected to a vehicle communication link 21. Other examples of the ECU within the vehicle 8 are also possible.

The DLC 20 can have various positions within the vehicle 8. For example, the DLC 20 can be located within a passenger compartment of the vehicle 8, within an engine compartment of the vehicle 8, or within a storage compartment within the vehicle 8. Particularly, the computing system 2 can include and/or connect to the DLC 20 via a DLC-to-display-device communication link 22. As such, the computing system 2 can be removed after the vehicle 8 has been serviced at a repair shop. In that way, the computing system 2 can be used to diagnose other vehicles, such as vehicle that subsequently arrive at a repair shop. As discussed above, the DLC 20 can comprise a connector such as an OBD I connector, an OBD II connector, or some other connector. Particularly, the DLC 20 can include one or more conductor terminals that connect to a conductor of the vehicle communication link such that the DLC 20 is communicatively connected to the ECU within the vehicle 8.

Sensor(s) 38 can represent various types of sensors that may measure operations of systems of the vehicle 8, including systems illustrated in FIG. 3. In some examples, one or more sensors 38 may communicate with the computing system 2 through the DLC 20 using the vehicle communication link 21 and/or the DLC-to-display-device communication link 22. In further examples, one or more sensors 38 may communicate directly with the computing system 2 through a wireless connection.

Figure 4:
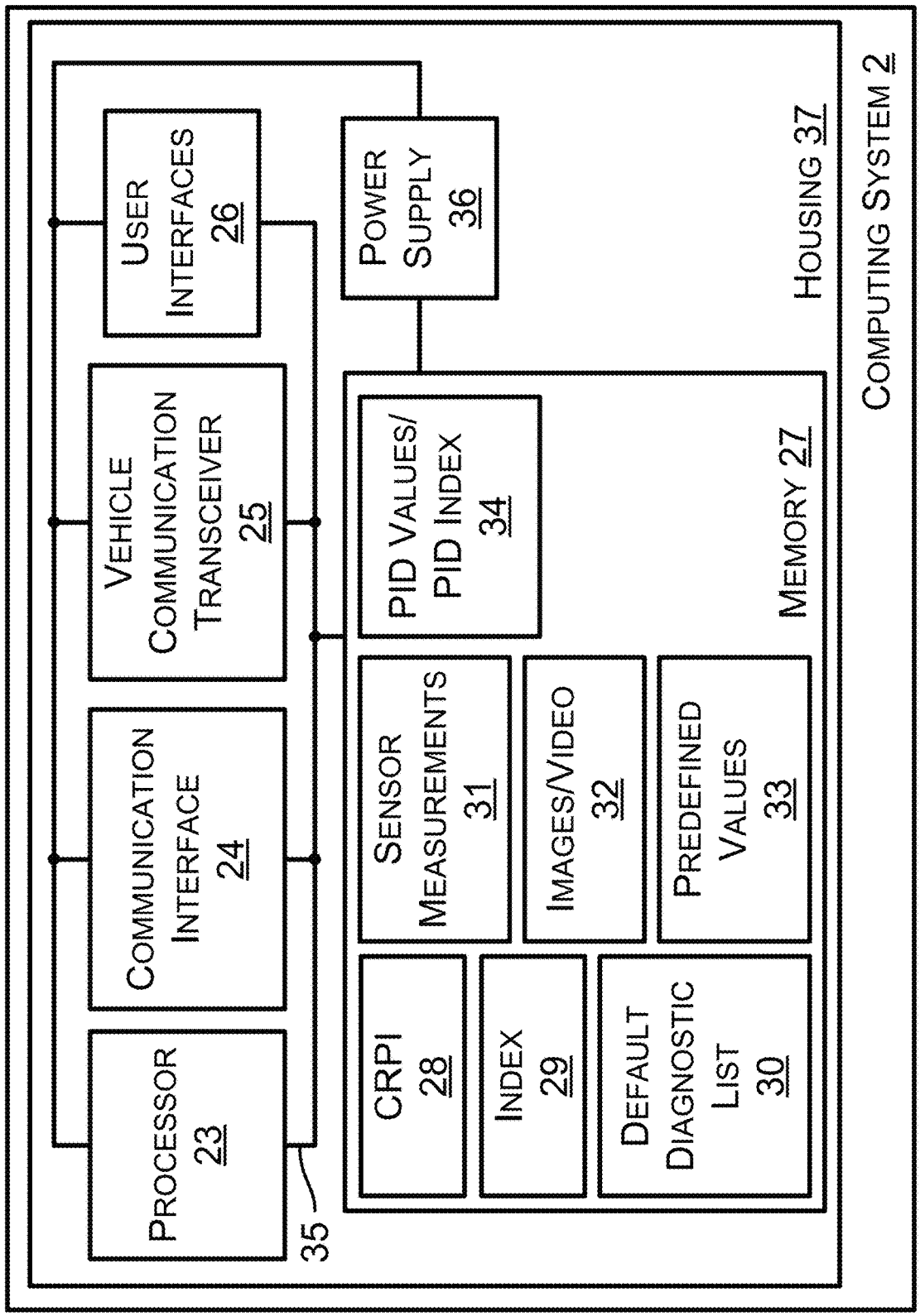
FIG. 4 is a block diagram of a computing system in accordance with one or more example embodiments.

FIG. 4 is a block diagram of the computing system 2. As indicated above, the computing system 2 may operate as a vehicle diagnostic tool, scanner, or other type of VST. In some examples, the computing system 2 may be a tablet computing system, a cellular phone (e.g., smartphone), a laptop or desktop computer, a head-mountable device (HIVID), a wearable computing system, or a different type of fixed or mobile computing system. As such, the configuration and type of computing system can vary within examples. For instance, the computing system 2 can have various physical designs and additional components within other examples.

As shown in FIG. 4, the computing system 2 includes a processor 23, a communication interface 24, a vehicle communication transceiver (VCT) 25, user interfaces 26, and memory 27. Two or more of these components as well as other components can be communicatively coupled or linked together via a system bus, network, or other connection mechanism 35. The computing system 2 can include more or fewer components within other examples.

The processor 23 (as well as any other processor discussed in this description, such as the processor 60 shown in FIG. 6)) can include one or more processors, such as one or more of the processors discussed below. In some implementations, the processor 23, 60 can include a general purpose processor, such as an INTEL® single core microprocessor or an INTEL® multicore microprocessor. A general purpose processor can be configured for operating within and/or can be disposed within a general purpose computer, such as a personal computer (PC).

In some implementations, the processor 23, 60 can include a special purpose processor, such as a neural network processor, a graphics processor, or an embedded processor. A special purpose processor can, but need not necessarily, be configured as an application specific integrated circuit (ASIC) processor.

An embedded processor refers to a processor with a dedicated function or functions within a larger electronic, mechanical, pneumatic, and/or hydraulic device, and is contrasted with a general purpose computer. In some implementations, the embedded processor can execute an operating system, such as a real-time operating system (RTOS). As an example, the RTOS can include the SMX® RTOS developed by Micro Digital, Inc., such that the processor 23, 60 can, but need not necessarily, include (a) an advanced RISC (reduced instruction set computer) machine (ARM) processor (e.g., an AT91SAM4E ARM processor provided by the Atmel Corporation, San Jose, Calif.), or (b) a COLD-FIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

In some implementations, the processor 23 can be configured to execute computer-readable program instructions (CRPI) 28 stored in the memory 27. The CRPI configured to carry out functions discussed in this disclosure, such as the CRPI 28, 64, can include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a conventional procedural programming language, such as the "C" programming language. The processor 23, 60 can also be configured to execute hard-coded functionality in addition to or as an alternative to software-coded functionality (e.g., via CRPI 28). Within example implementations, the processor 23 can be programmed to perform any function or combination of functions described herein as being performed by the computing system 2. Likewise, the processor 60 can be programmed to perform any function or combination of functions described herein as being performed by the server 4.

The communication interface 24 of the computing system 2 can include one or more communication interfaces. Each communication interface can include one or more transmitters configured to transmit data onto a network, such as the communication network 6. As such, the data transmitted by the communication interface 24 can comprise any data described herein as being transmitted, output, and/or provided by the computing system 2. Moreover, each communication interface can include one or more receivers configured to receive data carried over a network, such as the communication network 6. The data received by the communication interface 24 can comprise any data described herein as being received by the computing system 2, such as vehicle identifying information or a DTC.

The VCT 25 can include (a) a transmitter configured for transmitting a VDM to the vehicle 8 and/or to an ECU within the vehicle 8, and (b) a receiver configured for receiving a VDM transmitted by the vehicle 8 and/or by the ECU. As an example, the transmitter and the receiver of the VCT 25 can be integrated into a single semiconductor chip. As another example, the transmitter and the receiver of the VCT 25 can be separate semiconductor chips.

The VCT 25 can include and/or be connected to a wiring harness. The wiring harness can be configured to provide a wired connection between the computing system 2 and the vehicle 8. In some embodiments, the wiring harness can be removably connectable to the DLC 20 within the vehicle 8. In those embodiments, the DLC 20 can provide the computing system 2 with an indirect connection to an ECU, such as an ECU that provides PID parameters. In some other embodiments, the wiring harness can provide the computing system 2 with a direct connection to the ECU. The VCT 25 can include and/or connect to one or more connectors, one of which can be located at the end of the wiring harness.

The VCT 25 can be configured to communicate with the vehicle 8 and/or an ECU within the vehicle 8 wirelessly. The VCT 25 that communicates wirelessly can transmit radio signals carrying data or a communication, such as a request for PID parameters, and can receive radio signals carrying data or a communication, such as a response including PID parameters.

The VCT 25 can be configured to transmit VDM according to a VDM protocol and to receive VDM according to the VDM protocol. In one implementation, the VCT 25 can be configured to transmit VDM according to multiple VDM protocols and receive VDM according to multiple VDM protocols. As an example of that implementation, the VCT 25 can include multiple semi-conductor chips, each semiconductor chip dedicated for transmitting and receiving VDM according to at least one VDM protocol.

The user interfaces 26 can include one or more display interfaces and other potential elements configurable to display information to a user. For instance, the user interfaces 26 can represent a type of user interface that allows users to interact with the computing system 2 through graphical icons and visual indicators. The user interface 26 can also enable the user to use the computing system 2 to communicate with other devices (e.g., sensors) measuring aspects of the vehicle. Various example graphical user interfaces are described below with regards to FIG. 5.

The user interfaces 26 can also include various types of interfaces configurable to receive users' inputs and other information. For example, the user interfaces 26 may include one or more microphones configured to detect and receive vocal input from users and/or other sounds. In some examples, the microphones can detect and receive any sound as the sound occurs (e.g., when the user provides a vocal input, the microphone captures it). Alternatively, the microphones can be configured to detect audio in response to the user pushing a button, using an associated application, or some other form of activation technique. In some examples, the microphones may operate as physically separate devices from the computing system 2.

In further examples, the user interfaces 26 can include buttons, switches, joysticks, or other physical structures configurable to receive inputs from one or multiple users. For example, the computing system 2 can include a button that a user can use to record a date and time of the button push, such as recording button pushes during the operation of a vehicle. The user interfaces 26 can include other mechanical structures that enable a user to provide inputs to the computing system 2. For example, the user interfaces 26 can include a motion sensor configured to detect and measure movements of the user.

The memory 27 can include one or more types of memories. A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory. For instance, the memory 27 can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

The memory 27 stores computer-readable data, such as the CRPI 28, an index 29, and a default diagnostic list 30. The CRPI 28 can comprise a plurality of program instructions and can also include data structures, objects, programs, routines, or other program modules that can be accessed by a processor and executed by the processor to perform a particular function or group of functions and are examples of program codes for implementing steps for methods described in this description. In general, the CRPI 28 can include program instructions to cause the computing system 2 to perform any function described herein as being performed by the computing system 2 or to cause any component of the computing system 2 to perform any function herein as being performed by that component of the computing system 2. As an example, the CRPI 28 can include program instructions to perform the set of functions 200 described herein or similar functions.

The index 29 may include a listing of PIDs, component tests, functional tests, and/or reset procedures, among other possible information. In some examples, the index 29 may also include additional associated information. For example, as part of a PID index (e.g., PID index 70 described in FIG. 7), PID descriptors may also be stored for display by the computing system 2. As a further example, information indicating how to communicate a request for each PID value to the vehicle 8 may also be stored as part of a PID index.

The default diagnostic list 30 may indicate particular PIDs, VCPs, functional tests, component tests, and/or reset procedures to display for a given symptom or set of symptoms for the vehicle 8. In other examples, the default diagnostic list 30 may indicate which PIDs, functional tests, component tests, and/or reset procedures to display for any symptom when a symptom-based filter list is unavailable from the server 4.

The memory 27 may further store sensor measurements 31, images/video 32, predefined values 33, and PID values/PID index 34, among other possible information. Sensor measurements 31 may correspond to sensor data provided by various sensors that can communicate with the computing system 2. For example, the computing system 2 may communicate and store temperature measurements from a thermal sensor. In further examples, the computing system 2 can communicate with other sensors that can measure aspects of operation of the vehicle.

In some examples, the computing system 2 may include or communicate with digital oscilloscopes to obtain sensor data. A digital oscilloscope may display voltage over a period time, which can help identify a vehicle fault associated with a vehicle symptom, such as an engine knock, an engine misfire, or a pulsing vehicle brake. In other examples, the computing system 2 may receive sensor data from a pressure sensor configured to measure pressure fluctuations for exhaust, intake, crankcase, and fuel rail of the vehicle 8. Similarly, the computing system 2 may communicate with pressure transducers that can measure pressure related data from the vehicle 8. In some examples, the computing system 2 may communicate with a laser thermometer, a sniffer and/or gas analyzer configured to detect certain odors (e.g., richness) in the gas, gas composition, exhaust, coolant, etc.

In addition, the computing system 2 may communicate with a microphone system (e.g., the Blue-point® electronic squeak and rattle finder). The microphone system can include microphones capable of connecting to various parts of the vehicle 8. For example, a user can position microphones nearby the engine and other components of the vehicle 8. The microphone system can enable the user to listen to gears, bearings, and suspension while the vehicle 8 is under load so that problems can be more accurately pin-pointed. In some examples, upon hearing a noise, the microphone system may provide an alert to the user through the computing system 2. For example, a microphone may receive a sound wave above a certain decibel (dB) level or within a certain frequency range and cause the computing system 2 to drop a flag to mark that moment. The microphone system may also detect an audible signal and provide the signal to processing circuitry for capture and comparison to known audible signals. The comparison may result in the computing system 2 dropping a flag to mark the time of capture of the audible signal capture.

As an example, the microphone system may detect a "knocking sound" originating from the engine. In response, the computing system 2 can trigger an oil pressure sensor measurement to determine if the oil pressure sensor or an oil pump requires a replacement. In another example, the microphone system may be placed in proximity to brakes of the vehicle 8, detect sounds coming from the brakes as the vehicle 8 travels uphill, and responsively cause the computing system 2 to drop a flag for subsequent review as a result. In a further example, the microphone system may detect for turbocharge boost leaks via high pitch sounds.

In other examples, other communication can occur between devices operating in the vehicle. For example, the user can use the computing system 2 to trigger operation of one or more sensors measuring aspects of operation of one or more vehicle systems. For instance, the user may provide a vocal command or physical input to the computing system 2 that causes the computing system 2 to trigger operation of one or more sensors. In some instances, triggering operation of one or more sensors may involve causing the computing system 2 or another system to record sensor measurements from the one or more sensors starting at that time period. The time period may end when the computing system 2 transmits a stop signal or after a predetermined duration. Further, some examples may involve a sensor similarly triggering one or more sensors to capture information regarding operation of one or more systems of the vehicle for later review by the user.

In some implementations, a sensor can connect to an analog or digital input of the processor 23. In those or other implementations, a sensor can connect to an analog-to-digital converter connected to a digital input of the processor 23. As an example, a sensor can output an analog voltage signal between zero volts and five volts. As another example, a sensor can output a pulse-width modulated signal between zero volts and twelve volts. Other examples of sensor outputs and sensor output voltage ranges are possible.

Images/video 32 may correspond to images and/or video captured by a camera or camera systems associated with a vehicle (e.g., the vehicle 8). For example, the computing system 2 can activate and send instructions to a camera or camera system associated with a vehicle. The camera may capture images or video of gauges, the interior of the vehicle, the exterior of the vehicle, or a path of travel in response to receiving instructions from the computing system 2, for instance.

Predefined values 33 may include one or more predefined values used to compare to the current value of a PID. For instance, predefined values 33 may include predefined thresholds or other types of values that can be used to analyze the current condition of vehicle systems.

PID values/PID index 34 may include information indicating specified values of parameters associated with a vehicle component (e.g., sensor values) as well as PIDs arranged in indices. The computing system 2 may acquire PID values from a vehicle (e.g., the vehicle 8) or another device (e.g., the server 4). In some examples, upon acquiring PID values from the vehicle 8, the computing system 2 may arrange the PID values into PID indices within the PID values/PID index 34.

The computing system 2 can also include a power supply 36. A power supply such as the power supply 36 or any other power supply discussed in this disclosure can include (1) a connection to an external power source, and (2) circuitry to provide an electrical current to electrically-operable component(s) connected to the power supply. As an example, the external power source can include a wall outlet at which a connection to an alternating current can be made. As another example, the external power source can include an energy storage device (e.g., a battery) or an electric generator. As yet another example, the processor 23, the communication interface 24, the VCT 25, the user interfaces 26, and/or the memory can be and electrically-operable component.

Additionally or alternatively, a power supply such as the power supply 36 or any other power supply discussed in this disclosure can include (1) a connection to an internal power source, and (2) power transfer circuitry to provide an electrical current to flow to electrically-operable component(s) connected to the internal power source. As an example, the internal power source can include an energy storage device, such as a battery.

Furthermore, a power supply such as the power supply 36 or any other power supply discussed in this disclosure can include a circuit protector and/or a signal conditioner.

The computing system 2 can include a housing 37 that provides support for the processor 23, the communication interface 24, the VCT 25, the user interfaces 26, the memory, the connection mechanism 35, and/or the power supply 36. The support provided by the housing 37 can be direct support in which another component of the computing system 2, such as a display of the user interfaces 26 directly contacts the housing 37. Alternatively and/or additionally, the support provided by the housing 37 can be indirect support in which another component of the computing system 2 is located upon or within another component of the computing system 2 that directly contacts the housing 37. For instance, the computing system 2 can include a circuit board or other substrate that directly contacts the housing 37 and upon which the processor 23, the communication interface 24, the VCT 25, the user interfaces 26, the memory, the connection mechanism 35, and/or the power supply 36 is disposed.

Figure 5:
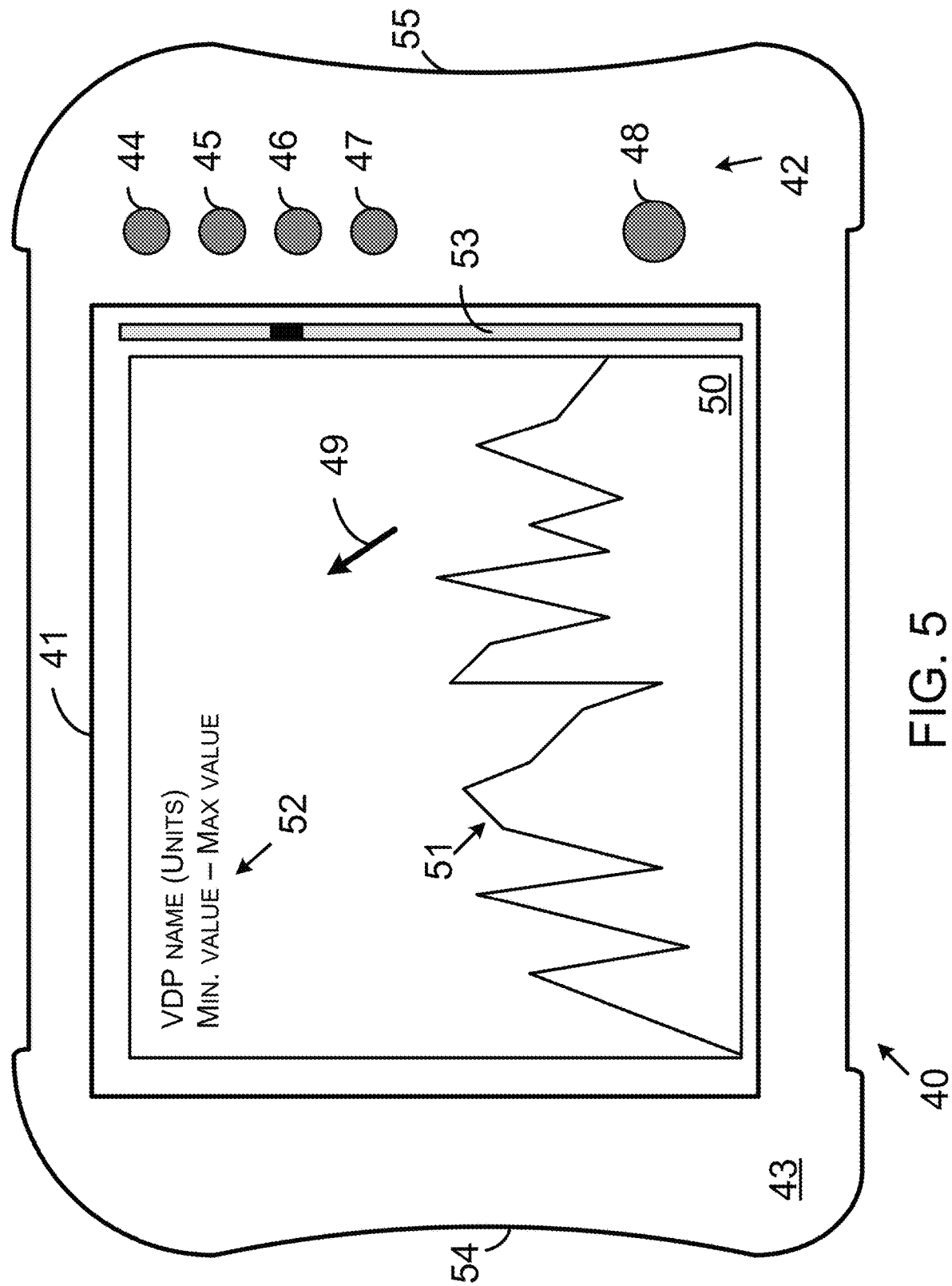
FIG. 5 is a diagram of a VST with a display in accordance with one or more example embodiments.

Next, FIG. 5 is an illustration of an example vehicle service tool in accordance with the example embodiments. The VST 40 can operate utilizing the computing system 2 shown in FIG. 4 or utilizing another computing system. In some examples, the VST 40 can represent a physical configuration of the computing system 2. As such, the VST 40 includes a display 41, a user input section 42, and a housing 43 with the display 41 and the user input section 42 making up a part of a user interface configured to receive input from a user and provide output to the user of the VST 40.

In some examples, the display 41 of the VST 40 can include a touchscreen interface/display, such as a color touchscreen used on the MODIS™ ultra integrated diagnostic system (reference number EEMS328W) available from Snap-on Incorporated of Kenosha, Wis. or another type of touch-screen interface. In other examples, the display 41 can include a backlit color liquid crystal display (LCD) having a capacitive, resistive, or infrared touchscreen interface or panel or a plasma display or a light emitting diode (LED) display. In further examples, the display 41 can include a display like those used as part of a tablet device (such as an IPAD® tablet device from Apple Inc., or a SAMSUNG GALAXY TAB tablet device from Samsung Electronics Co., Ltd.). As another example, the display 41 can include a display like displays used on a smartphone (such as an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea). Other examples of the display 41 on the VST 40 are also possible.

As shown in FIG. 5, the display 41 can have a rectangular-like shape, such as a rectangle with square corners or a generally rectangular shape with rounded corners, but the display 41 is not limited to such shapes. For instance, the display 41 can have a circular or triangular shape within other examples. Further, in other examples, the VST 40 may include multiple displays (e.g., a front display and a back display).

The VST 40 further includes the user input section 42, which can include various types of input mechanisms for enabling a user to communicate with the VST 40. For instance, as shown in FIG. 5, the user input section 42 can include one or more input selectors, such as input keys 44, 45, 46, 47, and 48. The user input keys can be arranged in any of a variety of configurations. For instance, input key 44 can represent an up-direction selection, input key 45 can represent a right-direction selection, input key 46 can represent a down-direction selection, input key 47 can represent a left-direction selection, and input key 48 can represent an enter selection. Pressing one of the input keys can cause a display pointer 49 to move in a direction represented by the input key being pressed. Pressing the input key 48 can cause selection of a displayed data element to which the display pointer 49 is pointing. In other examples, the user input section 42 may include input controls arranged in other configurations, such as joysticks, touchpads, or other button layouts (e.g., a directional pad). In further examples, the VST 40 may include other components for receiving input from a user, such as a microphone to receive verbal commands or a camera for detecting motions of the user.

The processor 23 shown in the computing system 2 in FIG. 4 can execute program instructions of the CRPI 28 to cause the display 41 of the VST 40 to display one or more vehicle data parameter (VDP) graph windows or other information. A VDP graph window can represent information corresponding to one or more PIDs obtained from the vehicle 8. For instance, the VDP graph window can include a VDP line graph that represents parameters relating to a particular PID. The display 41 can display one or more VDP graphs using different size windows that are adjustable by a user. For instance, as shown in FIG. 5, the VST 40 can cause the display 41 to display VDP graph 50 shown in a rectangular window. In other examples, the display 41 can display vehicle parameters as digital values. Other examples are also possible.

The VDP graph 50 can include various elements, such as VDP line graph 51 representing parameters corresponding to a PID. The VDP graph 50 can also show graph text 52, which may include information such as a name of a parameter represented by the VDP line graph 51, a units identifier identifying the units of the VDP line graph 51 (e.g., volts, percent, or counts), and threshold ranges (e.g., minimum and maximum thresholds associated with a particular PID). In some instances, the minimum and maximum ranges can be restricted to the minimum and maximum values of the VDP line graph 51 currently displayed within the VDP graph 50. For instance, memory 27 can store minimum and maximum values for one or more vehicle parameters and use those stored minimum and maximum values to populate the graph text 52 when a parameter associated with minimum and maximum values is displayed by the display 41 on the VST 40.

The processor 23 can execute program instructions of the CRPI 28 to cause the display 41 to display one or more scroll bars, such as the scroll bar 53. The scroll bar 53 can be used to scroll through multiple graphs of parameters corresponding to various PIDs or other information displayable on the display 41. In further examples, the processor 23 can execute program instructions of the CRPI 28 to cause the display 41 to display a graph view slider that is configurable to modify a view of the graph of parameters corresponding to a given PID on the display 41.

The housing 43 can provide support or protection of components of the VST 40. As such, in some examples, the housing 43 can include hand grips 54, 55 to enable a user to hold the VST 40. The housing 43 can include one or more port openings (not shown) for connecting one or more communication links, such as the communication links 9, 11. In other examples, the housing 43 can have other configurations.

Figure 6:
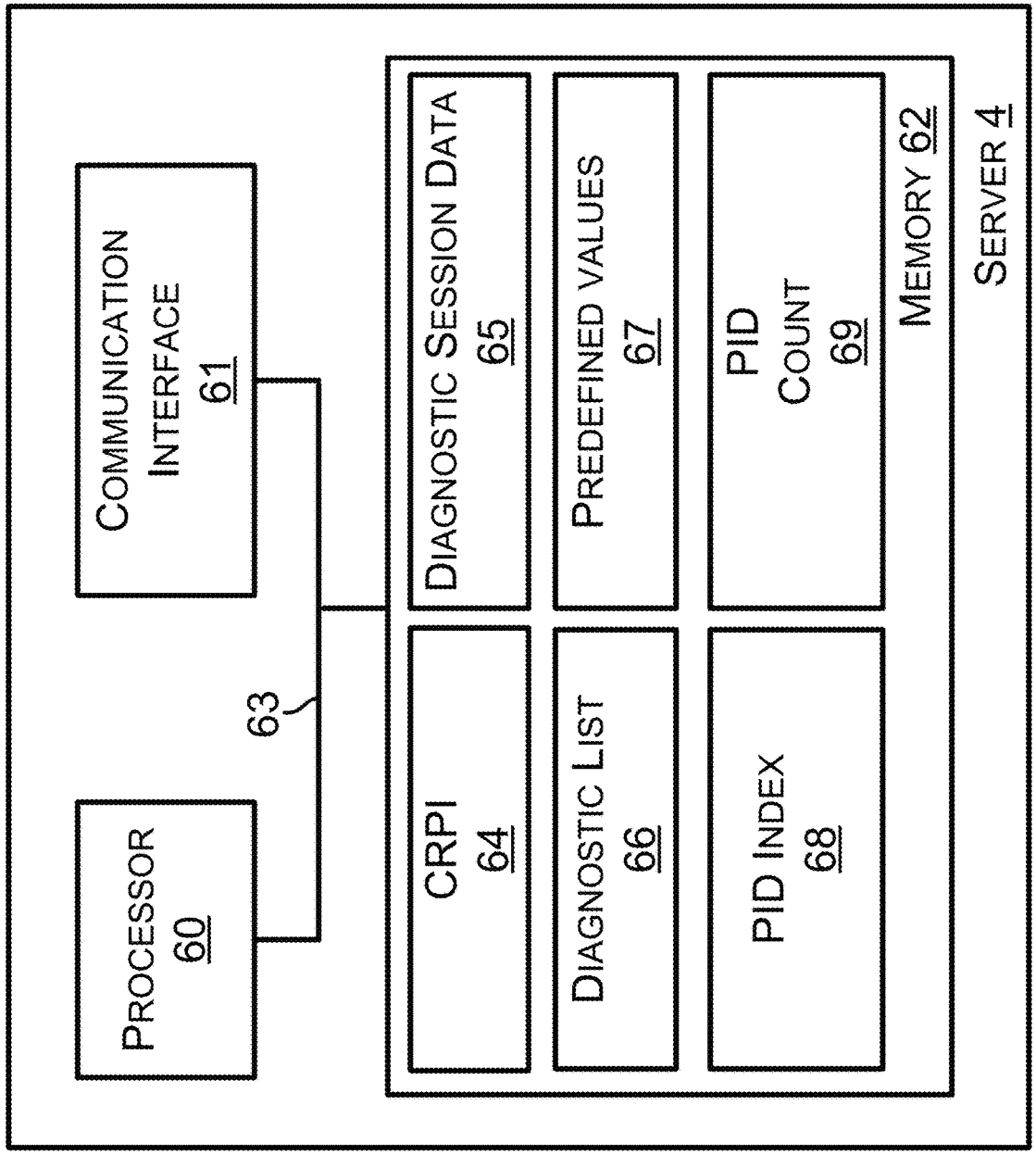
FIG. 6 is a block diagram of a server in accordance with one or more example embodiments.

Next, FIG. 6 is a block diagram of the server 4. Particularly, the server 4 comprises a processor 60, a communication interface 61, and a memory 62. Two or more of those components can be communicatively coupled or linked together via a system bus, network, or other connection mechanism 63. In other examples, the server 4 can include more or fewer components. The server 4 can include a power source. At least one of processor 60, the communication interface 61, and/or the memory 62 can comprise an electrically-operable component connected to the power source in the server 4.

The processor 60 can be configured to execute computer-readable program instructions (CRPI), such as CRPI 64 stored in the memory 62. The processor 60 can be configured to execute hard-coded functionality in addition to or as an alternative to software-coded functionality (e.g., via CRPI 64), and can be programmed to perform any function or combination of functions described herein as being performed by the server 4. Examples of the processor 60 are discussed above.

The memory 62 stores computer-readable data, such as the CRPI 64, diagnostic session data (DSD) 65, a diagnostic list 66, predefined values 67, PID index 68, and PID count 69. The memory 62 may correspond to various types of memory and may store other information within examples.

The DSD 65 can comprise data the server 4 can use to determine an operating state of the computing system 2. The data the server 4 uses to determine an operating state of the computing system 2 can include vehicle identifying information, data indicating an elapsed time since the server 4 last received a communication from the computing system 2, data indicating the most recent type of diagnostic list requested by and/or transmitted to the computing system 2, and/or data indicating a repair has been made to the particular vehicle.

The DSD 65 can comprise data indicative of the determined operating state of the computing system 2. Examples of the operating state include (i) the computing system 2 is connected to the server 4, (ii) the computing system 2 is not connected to the server 4 (i.e., disconnected from the server 4), (iii) the computing system 2 is connected to a particular vehicle (e.g., the vehicle 8), (iv) the computing system 2 is no longer connected to the particular vehicle (i.e., disconnected from the particular vehicle), (v) the computing system 2 is in a request and/or display diagnostic list mode for the particular vehicle, (vi) the computing system 2 has exited the request and/or display diagnostic list mode for the particular vehicle, and (vii) the computing system 2 has returned to the request and/or display diagnostic list mode for the particular vehicle.

The DSD 65 can also comprise data indicating a diagnostic session at the computing system 2 is active or inactive. The server 4 can determine a new diagnostic session is active upon receiving vehicle identifying information for a particular vehicle while the DSD 65 does not include data indicating a diagnostic session is active for the particular vehicle. The server 4 can determine an active diagnostic session for a particular vehicle has transitioned to inactive upon receiving vehicle identifying information for a different particular vehicle. The server 4 can determine an active diagnostic session for a particular vehicle has transitioned to an inactive session upon determining a threshold amount of time has elapsed since a particular activity of the active diagnostic session. As an example, the particular activity can comprise receiving a request from the computing system 2, receiving a communication indicating the computing system 2 is connected to the communication network 6 and/or transmitting a response with a diagnostic list 66 to the computing system 2. Other examples of the particular activity are also possible. The diagnostic list 66 may include OBD data or other information from the vehicle or vehicles. For instance, the diagnostic list 66 may indicate particular PIDs, functional tests, component tests, and/or reset procedures to display for a given symptom or set of symptoms for the vehicle 8. In other examples, the diagnostic list 66 may indicate which PIDs, functional tests, component tests, and/or reset procedures to display for any symptom.

The predefined values 67 can comprise thresholds and other values for PIDs. These values may be predefined and used to analyze the current value of the PIDs in some examples. Particularly, the analysis may compare a PID's current value to one or more predefined values 67 to determine a difference that can be used to indicate information about the vehicle system associated with the PID. The information may represent the health of the vehicle system when the PID is configured to convey a health aspect of the vehicle system, like a VCP.

The values may be predefined prior to the comparison with a PID's current value. For instance, the vehicle manufacturer, a technician, or a user may predefine one or more values for use during an analysis of a vehicle system's health. In some examples, a predefined value may be a threshold.

For instance, the threshold or thresholds for each PID can comprise a maximum data value and a minimum data value. The predefined values 67 comprise one or more thresholds for PIDs from each set of vehicles identifiable by some particular vehicle information. In this way, the server 4 can provide the computing system 2 with applicable thresholds with respect to a particular vehicle connected to the computing system 2.

In one respect, the predefined values 67 can comprise thresholds defined by a vehicle manufacturer. For a particular PID associated with a DTC, the vehicle manufacturer may define the maximum data value as the greatest data value for the particular PID an ECU would output while the associated DTC is set to inactive, and the vehicle manufacturer may define the minimum data value as the lowest data value for the particular PID the ECU would output while the associated DTC is set to inactive. In another respect, the predefined values 67 can comprise thresholds determined by the server 4 from PID data values received within communications that include PID data values. The server 4 can store the received PID data values within the predefined values 67 and determine the maximum and minimum data values for each PID for each set of vehicles identifiable by particular vehicle identifying information.

In yet another respect, the predefined values 67 for a particular PID can be associated with a particular vehicle type and a particular operating condition of the particular vehicle type. The particular operating condition can be based on one or more operating condition values for the particular vehicle type. For example, the one or more operating condition values can include an engine RPM value, an engine coolant temperature value, and/or a value indicating the engine emission system is operating in a closed loop control mode. An operating condition value can include a range of values, such as engine RPM values ranging from 500 RPM to 1,000 RPM or an engine coolant temperature range of 90° C. to 102° C. A health check based on predefined values associated with a particular operating condition can be performed when the vehicle is operating at the particular operating condition defined by the operating condition values.

PID index 68 can include an indexed list of PIDs applicable to one or multiple vehicles and operation of the one or more vehicles. For instance, PID index 68 may include a variety of PIDs arranged according to one or more parameters associated with the PIDs. As an example, PID index 68 may include a combination of PIDs and VCPs. In another example, PID index 68 may include one or more VCPs. In some examples, the server 4 may store PIDs in the PID index 68 for a vehicle (e.g., the vehicle 8).

The server 4 can maintain a PID count 69 that indicates how many PID data values have been received and/or stored for a particular PID. The server 4 can compare the PID count to a first threshold PID count value stored in the predefined values 67. If the server 4 determines that the PID count is less than the first threshold PID count value, the server 4 can produce a first threshold for the particular PID. As an example, the server 4 can determine the first threshold for the PID to be a mean maximum PID data value plus X standard deviations of the mean maximum PID data value and a mean minimum PID data value minus X standard deviations of the mean minimum PID data value. The mean maximum PID data value is the mean of maximum PID data values for the particular PID across vehicles identifiable by the particular vehicle identifying information with all DTC from the ECU that provides the particular PID set to inactive. The mean minimum PID data value is the mean of minimum PID data values for the particular PID across vehicles identifiable by the particular vehicle identifying information with all DTC from the ECU that provides the particular PID set to inactive.

As the server 4 continues to receive PID data values for the particular PID, the server 4 can determine the quantity of received PID data values for the particular PID exceeds the first threshold PID count value, but is less than a second threshold PID count value. In this situation, the server 4 can produce a second threshold for the particular PID. As an example, the server 4 can determine the second threshold for the PID to be a mean maximum PID data value plus X-1 standard deviations of the mean maximum PID data value and a mean minimum PID data value minus X-1 standard deviations of the mean minimum PID data value. The first threshold can be referred to as a loose threshold with respect to the second threshold. The second threshold can be referred to as a tight threshold with respect to the first threshold.

The server 4 can determine loose and tight thresholds in various manners. For example, before the server 4 has received a number of PID data values for the particular PID that exceeds the first threshold PID count value, the server 4 can add a first percentage of the mean maximum PID data value for the particular PID to that mean maximum PID data value or a first percentage of the maximum PID data value for the particular PID to that maximum PID data value. Furthermore, before the server 4 has received a number of PID data values for the particular PID that exceeds the first threshold PID count value, the server 4 can subtract a first percentage of the mean minimum PID data value for the particular PID from that mean minimum PID data value or a first percentage of the minimum PID data value for the particular PID from that minimum PID data value.

As the server 4 continues to receive PID data values for the particular PID, the server 4 can determine the quantity of received PID data values for the particular PID exceeds the first threshold PID count value, but is less than a second threshold PID count value. In this situation, the server 4 can add a second percentage of a mean maximum PID data value for the particular PID to that mean maximum PID data value or a second percentage of a maximum PID data value for the particular PID to that maximum PID data value, and the server 4 can subtract a second percentage of a mean minimum PID data value for the particular PID from that mean minimum PID data value or a second percentage of a minimum PID data value for the particular PID from that minimum PID data value. The second percentage can be smaller than the first percentage so that the thresholds determined using the second percentage is typically a tighter threshold range as compared to the thresholds determined using the first percentage.

The server 4 can provide the computing system 2 with a threshold or multiple thresholds for the particular PID without any tolerance values so that the computing system 2 does not need to calculate a threshold or thresholds to be displayed on a graphical interface of the computing system 2. Alternatively, the server 4 can provide the computing system 2 with a threshold or multiple thresholds for the particular PID with at least one tolerance value. The at least one tolerance value could, for example, be the first percentage or second percentage discussed above, or a value of the X standard deviations or the X-1 standard deviations. Other examples of the at least one tolerance value are also possible.

The CRPI 64 can comprise a plurality of program instructions. The CRPI 64 and any other CRPI described in this description can include data structures, objects, programs, routines, or other program modules that can be accessed by a processor and executed by the processor to perform a particular function or group of functions and are examples of program codes for implementing steps for methods described in this description. In general, the CRPI 64 can include program instructions to cause the server 4 to perform any function described herein as being performed by the server 4 or to cause any component of the server 4 to perform any function herein as being performed by that component of the server 4.

As another example, the CRPI 64 can include program instructions to perform session management with respect to the computing system 2. The processor 60 can use the DSD 65 to determine the operating state of the computing system 2. Upon and/or in response to determining the computing system 2 is in the request and/or display diagnostic list mode for the particular vehicle, the processor 60 can determine the requested diagnostic list and provide the computing system 2 with a response including the requested diagnostic list.

Upon and/or in response to determining the computing system 2 has exited the request and/or display diagnostic list mode for the particular vehicle and that a repair has been made to the particular vehicle, the processor 60 can provide a session-change response to the computing system 2 to direct the computing system 2 to display previously-displayed data, such as a diagnostic list 66. The session-change response can include the previously-displayed diagnostic list or the different diagnostic list.

Upon and/or in response to determining the computing system 2 has returned to the request and/or display diagnostic list mode for the particular vehicle, the processor 60 can provide a session-change response to the server 4 or a display device to direct the computing system 2 to display a previously-displayed diagnostic list or a different diagnostic list.

A communication interface such as the communication interface 61 or any other communication interface discussed in this description can include one or more communication interfaces. Each communication interface can include one or more transmitters configured to transmit data onto a network, such as the communication network 6. The data transmitted by the communication interface 61 can comprise any data described herein as being transmitted, output, and/or provided by the server 4. Moreover, each communication interface can include one or more receivers configured to receive data carried over a network, such as the communication network 6. The data received by the communication interface 61 can comprise any data described herein as being received by the server, such as PIDs and PID data values and any request described herein.

A transmitter can transmit radio signals carrying data and a receiver can receive radio signals carrying data. A communication interface with that transmitter and receiver can include one or more antennas and can be referred to as a "radio communication interface," an "RF communication interface," or a "wireless communication interface." The radio signals transmitted or received by a radio communication interface can be arranged in accordance with one or more wireless communication standards or protocols such as an IEEE 802.15.1 standard for WPANs, a Bluetooth version 4.1 standard developed by the Bluetooth Special Interest Group (SIG) of Kirkland, Wash., or an IEEE 802.11 standard for wireless LANs (which is sometimes referred to as a WI-FI® standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (e.g., one or more signals or one or more electrical waves) carrying or representing data onto a wire (e.g., one or more wires) and a receiver can receive via a wire a signal carrying or representing data over the wire. The wire can be part of a network, such as the communication network 6. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a communication interface can include a destination identifier or address of a network device to which the data is to be transmitted. The data transmitted by a communication interface can include a source identifier or address of the system component including the communication interface. The source identifier or address can be used to send a response to the network device that includes the communication interface that sent the data.

A communication interface that is configured to carry out communications over the communication network 6, such as the communication interface 61, can include a modem, a network interface card, and/or a chip mountable on a circuit board. As an example the chip can comprise a CC3100 Wi-Fi® network processor available from Texas Instruments, Dallas, Tex., a CC256MODx Bluetooth® Host Controller Interface (HCI) module available from Texas instruments, and/or a different chip for communicating via Wi-Fi®, Bluetooth® or another communication protocol.

Next, FIG. 7 shows an example PID index 70, which comprises an ordered list of PIDs. Particularly, three example representations of PIDs are shown within the PID index 70, which represents the PIDs using PID numbers 71, index values 72, and PID names 73 (e.g., at least one word describing a PID). A different PID index (for use with the example embodiments) may represent PIDs using only one of those three example representations, a combination of any two of those three example representations, or with a different example PID representation. The VST 40 may use PID index 70 to display parameters related to a set of associated PIDs on the display 41. As shown, some of the PIDs (e.g., PIDs 31-36) may correspond to VCPs. In other examples, these PIDs may be indicated as VCPs in the PID index 70.

The index values 72 can, for example, comprise decimal, hexadecimal, or numbers of some other base to represent the PIDs within the PID index 70. Other example PID indexes may comprise multiple PID indices, such as a separate PID index for each of multiple different set of particular identifying information (e.g., a separate PID index for each Y/M/M or Y/M/M/E). As such, the separate PID index can be arranged like the PID index 70 or in another manner. The PID index 70 can comprise or be associated with particular vehicle identifying information. The server 4 can provide a PID index to the computing system 2 for identifying suggested PIDs to request from the vehicle 8 to diagnose the vehicle 8.

III. Example Display Presentations

Figure 8:
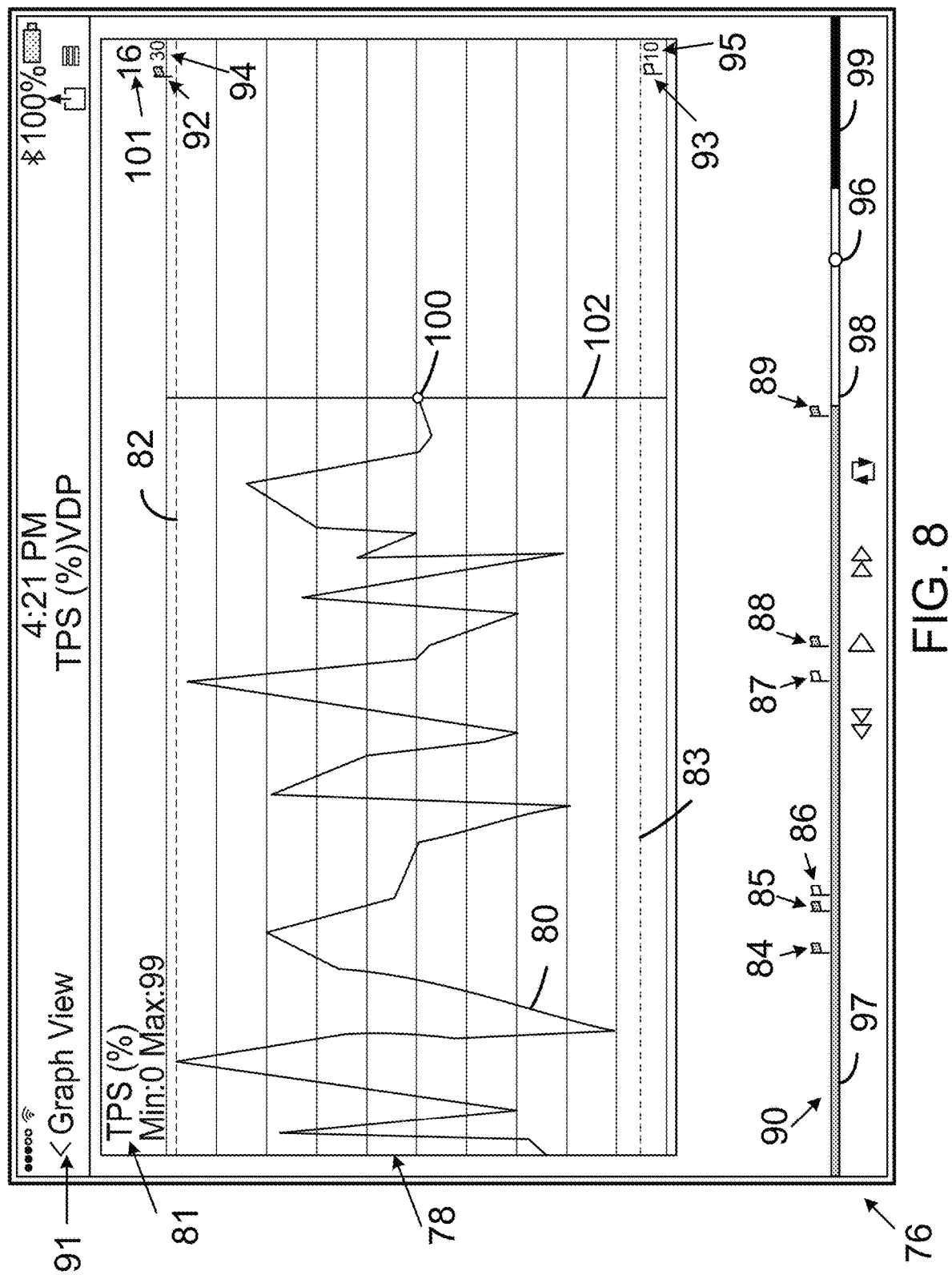
FIG. 8 is a diagram depicting a display presentation in accordance with one or more example embodiments.

Next, FIG. 8 is a diagram depicting an example display presentation (DP) 76 that the VST 40 can display on the display 41. The DP 76 is shown in a landscape orientation, but can have a vertical (e.g., portrait) orientation in other examples. As such, the DP 76 includes a VDP graph window 78 with a VDP line graph 80, VDP graph text 81, and VDP threshold indicators 82, 83 placed on the VDP line graph 80. The DP 76 also displays vehicle operating condition indicators 84, 85, 86, 87, 88, and 89 along with a time-based indicator 90, and further includes a view selector 91 for selecting different views for a set of VDP, at least one of which can include a currently displayed VDP. Besides the graph view depicted in FIG. 8, other views can include, but are not limited to, a digital view and a list view.

The VDP line graph 80 is an example of a line graph in which the area below the line graph is not shaded. The VDP line graph 80 can represent parameters related to a particular PID, such as a first PID that is part of a set of associated PIDs. The VDP line graph 80 can include or be displayed with other information related to operation of the vehicle 8. That other information can comprise VDP graph text 81, for example. In general, the VDP graph text 81 can include graph text pertaining to any VDP associated with or from the vehicle 8. As an example, the VDP graph text 81 can comprise text indicative of a threshold that pertains to a particular vehicle component (e.g., a throttle position sensor (TPS) position) or a PID associated with that vehicle component. The threshold can specify its units, such as a percentage, volts or amperes.

The VDP threshold indicator 82 shown positioned above the VDP line graph 80 in the VDP graph window 78 may represent an upper VDP threshold associated with a TPS position percentage shown in the VDP graph text 81. Similarly, the VDP threshold indicator 83 may represent a lower VDP threshold associated with a TPS position percentage. In some example implementations, the VDP threshold indicators 82 and 83 can include visual indicators (e.g., horizontal lines) indicative of the thresholds. A VDP indicator, such as VDP threshold indicator 82 or 83, can also include a vehicle operating condition (VOC) indicator. A VOC indicator can have unique characteristics to distinguish it from a different type of VOC indicator. In addition, the VDP graph window 78 includes an upper threshold indicator 94 that indicates a numeric value of the upper threshold of the VDP displayed in the VDP graph window 78. The VDP graph window 78 includes a lower threshold indicator 95 that indicates a numeric value of the lower threshold of the VDP displayed in the VDP graph window 78.

As further shown in FIG. 8, the VOC indicator of the VDP threshold indicator 82 includes a dark-colored flag icon 92, whereas the VOC indicator of the VDP threshold indicator 83 includes a light-colored flag icon 93. The dark-colored flag icon 92 and the light-colored flag icon 93 are further discussed with respect to FIG. 10.

The time-based indicator 90 depicted in the DP 76 can represent various time segments on a display of the VST 40. In other examples, the time-based indicator 90 can have other positions or configurations. As shown, the time-based indicator 90 can include a cursor positioner 96 and time segments 97, 98, and 99 to convey time information to a user of the VST 40. The cursor positioner 96 can correspond to a cursor 100 positioned in the VDP graph window 78 and may also correspond to a digital VDP value 101 that indicates a current value of the VDP at the cursor 100. The DP 76 shows the time-based indicator near a bottom of the DP 76. The time-based indicator 90 could be displayed at other locations within a DP.

The time segment 97 provides an indication of an amount time or percentage that frames or data values for the displayed VDP were captured prior to the frames or data values of the VDP currently displayed within the VDP graph window 78, relative to the time segments 98 and 99. The time segment 98 provides an indication of an amount of time or percentage represented by the VDP values displayed within the VDP graph window 78, relative to the time segments 97 and 99. The time segment 99 provides an indication of an amount of time or percentage that the VST can receive additional frames or data values of the VDP before prior instances of the received VDP are overwritten or otherwise deleted for storage of additional frame or data values of the VDP, relative to the time segments 97 and 98.

The VDP line graph 80 can be zoomed in or out within the VDP graph window 78 via a user interface of the VST 40. As an example, the cursor positioner 96 can be moved in a first direction (e.g., to the right) in order to zoom in on the VDP line graph 80 and moved in a second direction (e.g., to the left) in order to zoom out on the VDP line graph 80. As another example, the cursor 100 or a cursor bar 102 could be moved in the first and second directions to zoom in and zoom out, respectively, of the VDP line graph 80. As another example, zooming in on a VDP line graph can include decreasing the time represented horizontally within the VDP graph window 78 and zooming out on a VDP line graph can include increasing the time representing horizontally with the VDP graph window 78. Alternatively, repositioning the cursor 100 or the cursor bar 102 can include representing a current value of a VDP at another position within the VDP graph window 78.

Figure 9:
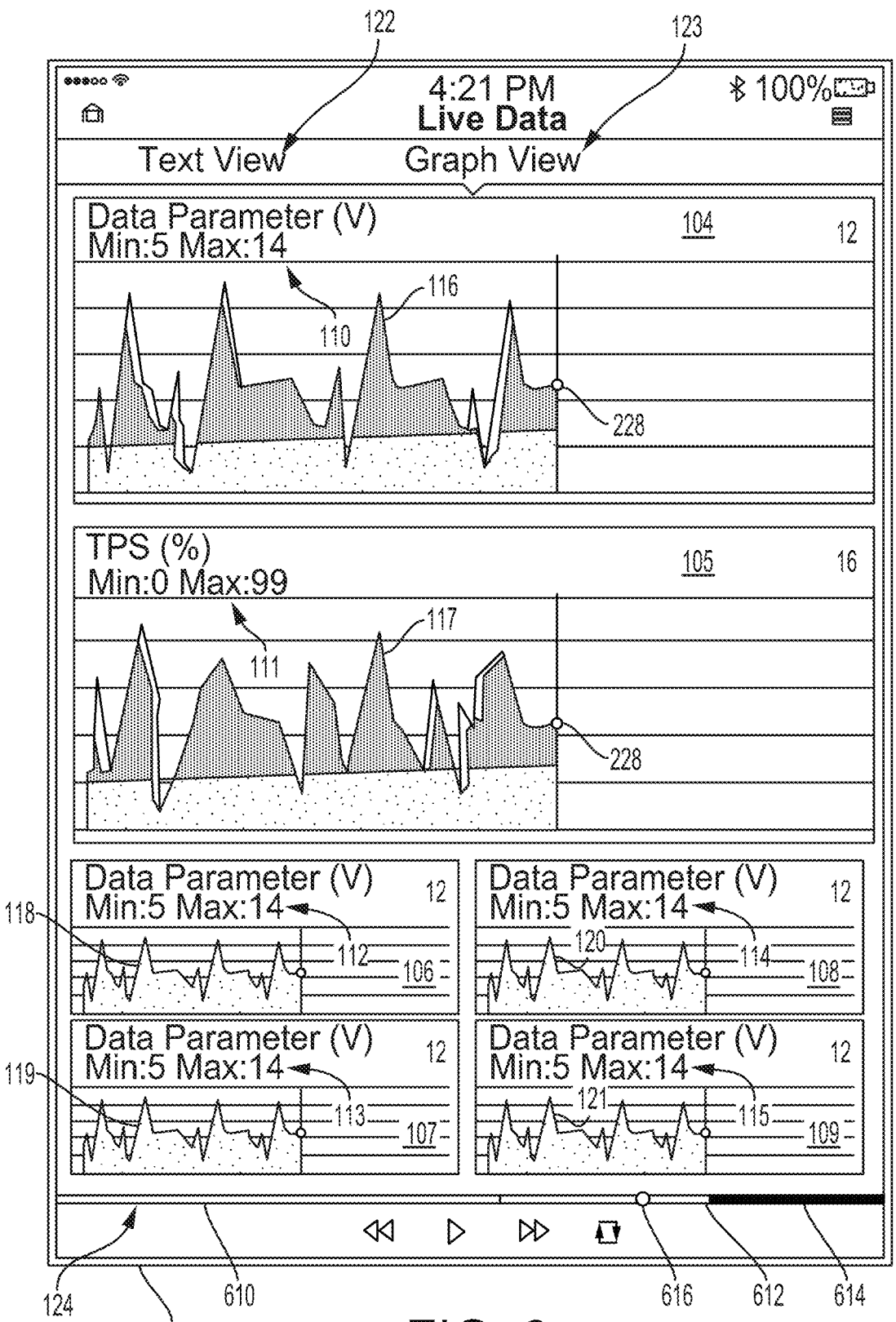
FIG. 9 is a diagram depicting another display presentation in accordance with one or more example embodiments.

Next, FIG. 9 is a diagram depicting another example display presentation 103 that the VST 40 may display on the display 41. The DP 103 is shown in a portrait orientation, but can be displayed in another orientation (e.g., landscape) within other examples. As such, the DP 103 displays VDP graph windows 104, 105, 106, 107, 108, and 109 that include VDP graph lines 116, 117, 118, 119, 120, and 121, and VDP graph text 110, 111, 112, 113, 114, and 115, respectively. Other examples are possible.

The VDP graph text 110-115 may provide text that identifies a different PID for each VDP graph window shown in the DP 103. For instance, the VDP graph text 110 may be associated with a particular PID and can specify units for the data values of the VDP graph line 116 and at least one of a minimum data value and a maximum data value. The minimum and maximum data values can indicate a low VDP threshold and a high VDP threshold, respectively, but are not so limited. For example the minimum and maximum data values can indicate a minimum data value and a maximum data value of the VDP currently displayed within the VDP graph window including or associated with the VDP graph text.

The DP 103 further includes a text view selector 122 and a graph view selector 123. While the display 41 of the VST 40 is displaying VDP graph windows in a graph view as shown in FIG. 9, the text view selector 122 can be selected by the display pointer, or otherwise (e.g., via a touchscreen interface or a voice command), to cause the display to begin displaying the VDP shown in one or more of the VDP graph windows 104, 105, 106, 107, 108, and 109, or the data represented therein, in a textual format. While the display is displaying VDP in a textual format, the graph view selector 123 can be selected by the display pointer or otherwise (e.g., via a touch screen, voice input) to cause the display to begin displaying the VDP graph windows 104, 105, 106, 107, 108, and 109.

The DP 103 includes the time-based indicator 124 with time segments 610, 612, 614, a cursor positioner 616, and a cursor 228 within each of the VDP graph windows 104, 105, 106, 107, 108, and 109. The cursor positioner 416 can be moved in either direction along the time-based indicator 124 to cause uniform movement of the cursor 228 within each of the VDP graph windows 104, 105, 106, 107, 108, and 109.

Figure 10:
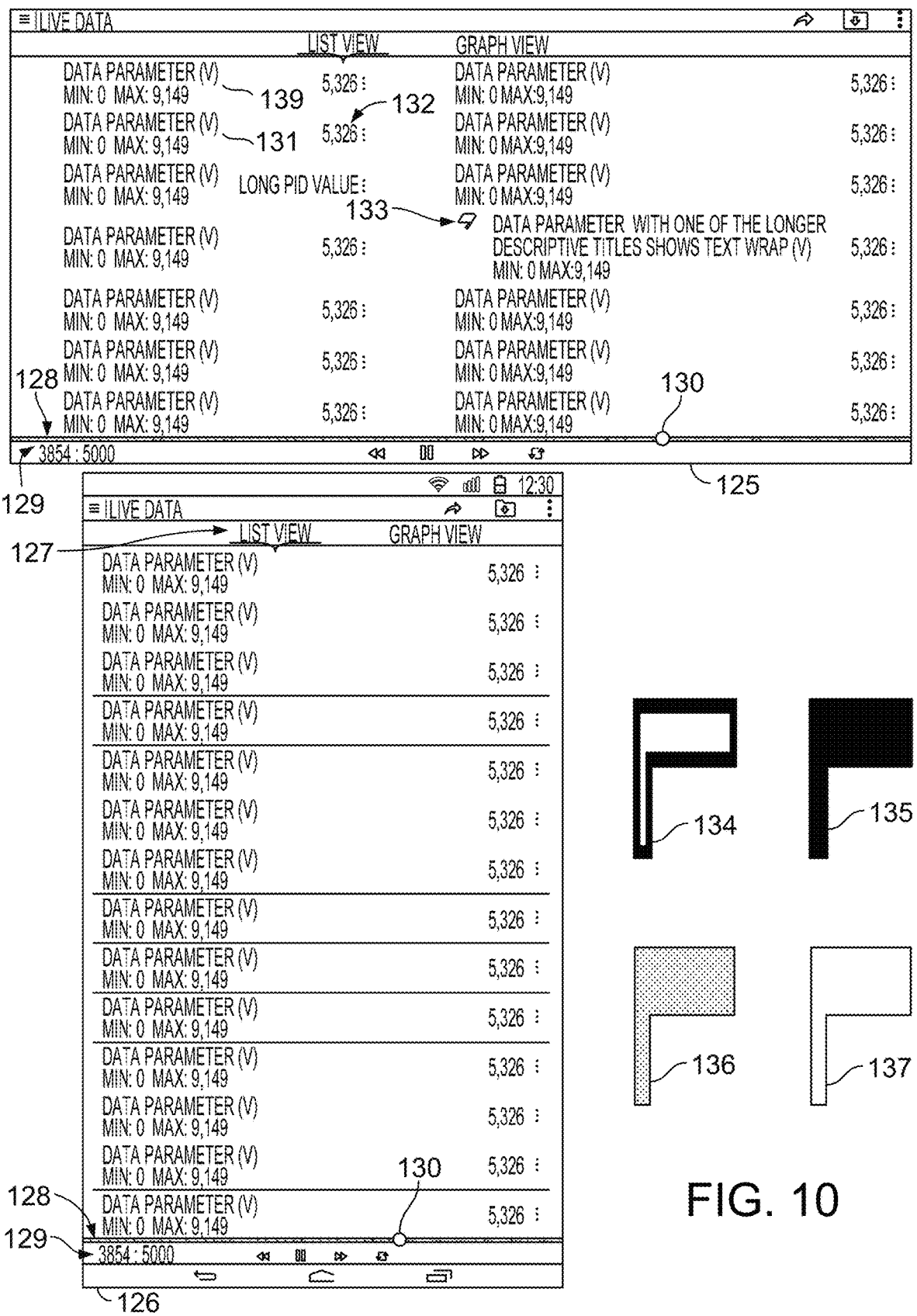
FIG. 10 is a diagram depicting multiple display presentations in accordance with one or more example embodiments.

Next, FIG. 10 is a diagram depicting example display presentations 125 and 126 that can be provided by a device via a display or graphical user interface. For instance, example devices that may display DPs 125, 126 can include the VST 40, a smartphone, or another type of device with a graphical user interface. The DPs 125, 126 include the DP selector 127 that can enable viewing a different VDP display presentation or displaying other information (e.g., a list of PIDs by selecting "LIST VIEW" or a graph of PIDs by selecting the "GRAPH VIEW". For instance, a selection of DP selector 127 causes DP 126 to display a different VDP display presentation (e.g., a list view presentation or graph view presentation). Either one of the DP 125 and the DP 126 may be entered from another type of view, such as a graph view or a digital view, by selection of the list view from a DP selector 127 in the other type of view.

Each of the DP 125 and the DP 126 include the time-based indicator 128 and a frame or data value indicator 129. As an example, the frame or data value indicator 129 indicates 3,834 of 5,000 frames or data values. In some cases, the VST 40 may have received an identical number of data values for each VDP identified in the list view of VDP. In accordance with those cases, the cursor positioner 130 can be moved to select a different frame or data value of the 5,000 frames or data values. In other instances, the VST 40 may receive a different number of data values for two or more VDP identified in a list view of VDP. In accordance with these other cases, the cursor positioner 130 can be moved to select a different frame or different value of the received frames or data values for a designated VDP. The data values for the other VDP can change to other data values in relation to the time at which the selected different frame or data value was received.

As shown in FIG. 10, a list view of VDP can include multiple VDP text identifiers (e.g., VDP text identifier 131, 139) and multiple VDP values (e.g., VDP value 132). A VOC indicator 133 is displayed for a VDP for which data values of that VDP breeched a VDP threshold (e.g., greater than an upper threshold or lower than a lower threshold). The processor 23 can detect a drag-and-drop input of a VDP displayed in a list view and move the VDP from its initial position when the drag-and-drop input is initiated to a position that includes the location to which the VDP was dragged and dropped by the drag-and-drop input.

The DP 125 and the DP 126 can include at least one scroll bar for entry of a scroll input that causes virtual VDP values not currently displayed by the DP 125 or the DP 126 to be displayed and to cause one or more currently displayed VDP values to be repositioned as a virtual VDP value that is not currently displayed by the DP 125 or the DP 126.

The processor 23 can execute program instructions of the CRPI 28 to provide a VDP threshold selection display by the display 41. The selection display can include selection of a VDP. The selection display can include a selection of at least one VDP threshold associated with the selected VDP or the VDP threshold(s) can be selected by default upon selection of the VDP. The selection display can include a selection of a VOC indicator for a VDP or a VDP threshold or the VOC indicator selection can be selected by default upon selection of the VDP or the VDP threshold.

FIG. 10 further shows VOC indicators 134, 135, 136, and 137 as examples of VOC indicators displayable by the display 41 on the VST 40. As shown in FIG. 10 and in other figures, each VOC indicator can include a flag and flagpole icon, but the VOC indicators are not so limited. Furthermore, the display 41 can display the VOC indicators with different colors or shading to indicate various characteristics with respect to a VDP threshold or a VOC. In one respect, the VOC indicator 134 includes an outlined flag (e.g., a white flag outlined in red) and the VOC indicator 135 includes a solid flag (e.g. a red flag). An outlined flag can be displayed to indicate that a VDP threshold is armed, but that the VDP values received for the VDP have not yet breached the VDP threshold. A solid flag can be displayed to indicate that a VDP value received for the VDP has breached an associated VDP threshold that was armed. Arming a VDP threshold can occur by selecting the VDP for display, by selecting a VDP threshold for a VDP, or by another manner. Upon arming a VDP threshold, the processor 23 can compare the VDP the VST receives to determine if the VDP is associated with the VDP threshold and whether it breaches the VDP threshold.

Additionally, the display 41 can display text associated with a VDP (e.g., a PID) in proximity to a VOC indicator. The display 41 can display the associated text in various ways to further indicate whether a VDP threshold has been breached. For example, the text associated with the VDP can be blue when a VDP threshold is armed, but not yet breached, and the associated text can be red when the armed VDP threshold has been breached. The processor 23 can cause the associated text to change colors in response to detecting the VDP threshold being breached.

In another respect, the VOC indicator 137 (e.g., a white flag) can indicate that a VDP high threshold has been breached, whereas the VOC indicator 136 (e.g., a gray shaded flag) can indicate that a VDP low threshold has been breached. In yet another respect, if VDP thresholds have been set up and armed for multiple VDP, then a VOC indicator for each VDP can be associated with a respective color or respective shading to distinguish the VOC indicators for each of the multiple VDP. Other colors, visual representations, and configurations are possible.

Figure 11:
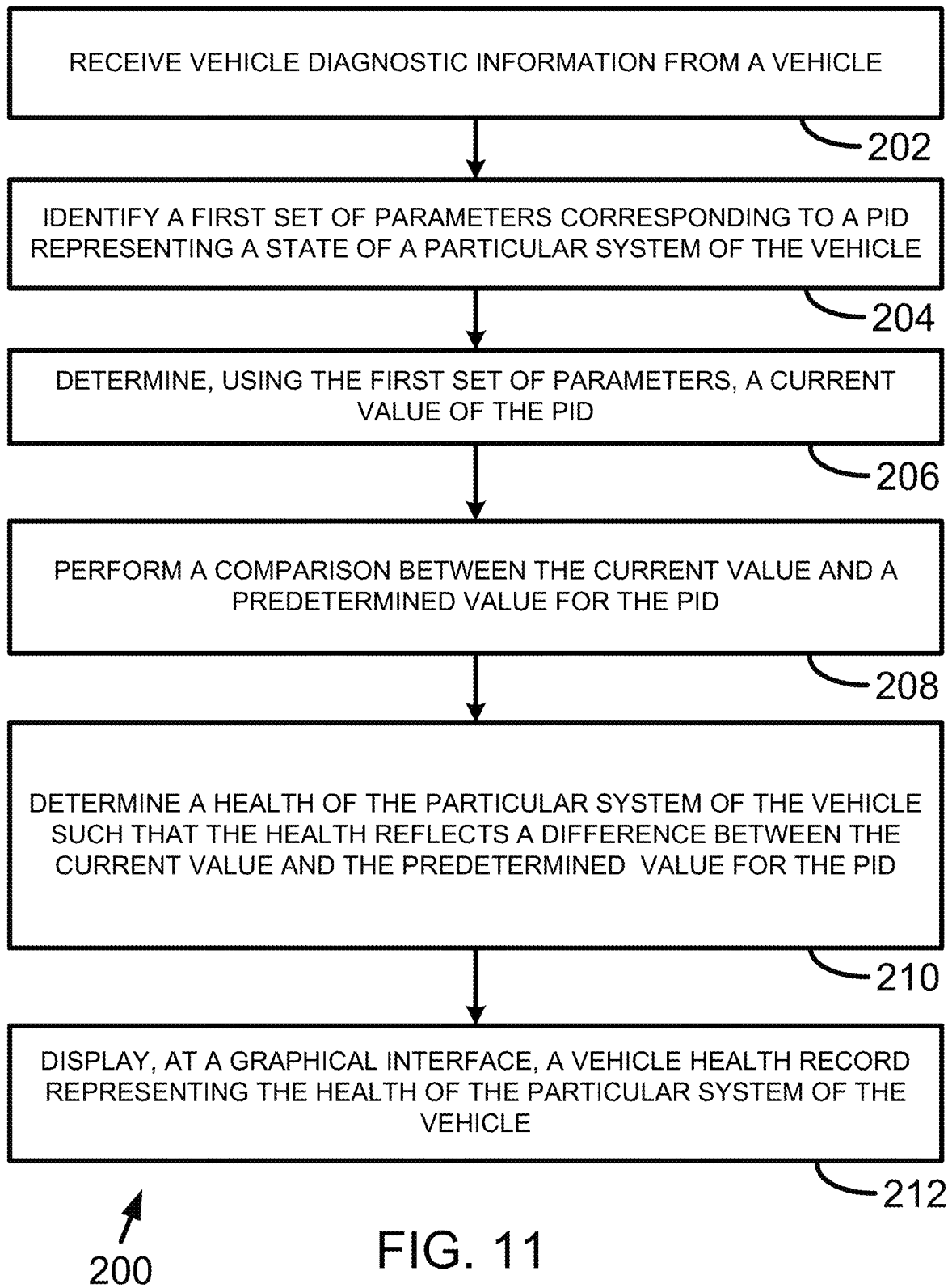
FIG. 11 is a flowchart for implementing a vehicle health record in accordance with one or more example embodiments.

FIG. 11 shows a flowchart depicting a set of functions 200 (or more simply "the set 200") that can be carried out in accordance with the example embodiments described in this description. The set 200 includes the functions shown in blocks 202, 204, 206, 208, 210, 212. The following description of the set 200 includes references to elements shown in other figures described in this description, but the functions of the set 200 are not limited to being carried out only by the referenced elements. A variety of methods can be performed using all of the functions shown in the set 200 or any proper subset of the functions shown in the set 200. Any of those methods can be performed with other functions such as one or more of the other functions described in this description.

Block 202 includes receiving vehicle diagnostic information from a vehicle. The computing system 2 or another type of computing system (e.g., smartphone, wearable computing system) may receive vehicle diagnostic information (VDI) from the vehicle 8. For instance, the computing system 2 may receive vehicle diagnostic information via a wired or wireless connection with the vehicle 8. In some examples, the computing system 2 may perform one or more functions of the set 200 with assistance from the server 4 or another computing device. For instance, the computing system 2 may obtain the vehicle diagnostic information from the vehicle and communicate the vehicle diagnostic information to the server 4 for processing.

The VDI may provide information related to the status, performance, and other aspects of systems of the vehicle 8. Particularly, the vehicle diagnostic information may include one or more sets of parameters corresponding to PIDs. For instance, the vehicle diagnostic information may include vehicle data parameters (VDP) that are associated with PIDs that reflect the current state of vehicle systems. The current state may reflect recent operations of a system, a condition of the system, or a combination of information about the system. In some instances, the information conveyed within the vehicle diagnostic information may depend on the type of vehicle system being analyzed.

As indicated above, the vehicle diagnostic information may include parameters related to PIDs, which may be based on a PID index 68 received from the server 4 shown in FIG. 6. In some examples, the vehicle diagnostic information may also include diagnostic trouble codes from the vehicle 8. The diagnostic trouble codes may indicate issues associated with one or more vehicle systems.

In some example embodiments, the computing system 2 obtaining vehicle diagnostic information from the vehicle 8 may be the VST 40 described in FIG. 5. Particularly, the VST 40 may request and obtain VDP from the vehicle 8 using a vehicle data message (VDM) (e.g., a serial data message). For instance, the VST 40 may use the DLC or another component to communicate with the vehicle 8 to obtain the VDP that describe operations of the vehicle 8. As an example implementation, the VST 40 may receive the VDP from the vehicle 8 in the form of an electrical signal.

In further example embodiments, the computing system 2 can receive vehicle diagnostic information from an on-board diagnostics (OBD) II reporting system of the vehicle 8 operating in OBD II, mode $01. Similarly, the computing system 2 can receive vehicle diagnostic information from an OBD reporting system of the vehicle 8 operating in OBD II, mode $02. In further examples, the computing system 2 can switch between receiving the parameters from the OBD II reporting system of the vehicle operating in mode 1, mode $02, and other OBD II modes.

Block 204 includes identifying a first set of parameters corresponding to a PID representing a state of a particular system of the vehicle. The computing system 2 may analyze the vehicle diagnostic information to identify parameters for PIDs that represent the states of various vehicle systems. For instance, the computing system may identify the first set of parameters for a first PID that represents the state of a first vehicle system (e.g., the engine) and identify a second set of parameters for a second PID that represents the state of a second vehicle system (e.g., the oil system). Within examples, parameters for PIDs representative of various vehicle systems may be identified, including but not limited to the engine(s), brake system, oil system, coolant system, tires, sensors, and steering system, etc.

In some instances, the computing system 2 may identify parameters for multiple PIDs that convey information for the same vehicle system. For example, the computing system 2 may determine parameters for multiple PIDs corresponding to the engine of the vehicle. Similarly, the computing system 2 may obtain parameters for PIDs for related systems. For example, the computing system may identify parameters for PIDs for each brake pad, each tire pressure, or other similar systems. In addition, the computing system 2 may be configured to identify a set of parameters corresponding to a PID representing the state of a vehicle system based on one or more diagnostic trouble codes received from the vehicle 8.

The computing system 2 may be configured to obtain multiple sets of parameters corresponding to PIDs representing different vehicle systems and subsequently organize the sets of parameters for PIDs according to each vehicle system. For instance, the computing system 2 may identify parameters for PIDs for each system, such as parameters for PIDs corresponding to the engine, parameters for PIDs corresponding to the braking system, and parameters for PIDs corresponding to the tires, etc. In some examples, the computing system 2 may be configured to identify parameters for PIDs for a particular vehicle system. For instance, the computing system 2 may identify parameters corresponding to the engine of the vehicle 8.

Block 206 includes determining, using the first set of parameters, a current value of the PID. The computing system 2 may analyze the identified parameters to determine the current value of the PID. The current value of the PID may reflect the current state of the associated vehicle system. For instance, when the PID corresponds to the oil system of the vehicle, the current value of the PID may reflect the current oil level of the oil system. Similarly, when the PID corresponds to the vehicle braking system, the current value of the PID may reflect the current state (e.g., amount of wear) of the brakes.

Block 208 includes performing a comparison between the current value and a predetermined value for the PID. After determining the current value for the PID, the computing system 2 may be configured to compare the current value to one or more predefined values for the PID. These predefined values may correspond to predetermined threshold values for the PID that help the computing system 2 determine the current health of the vehicle system. The comparison may enable the computing system 2 to compare the current value for the PID relative to at least one desired value for the PID. For instance, the comparison may indicate whether or not the current value for the PID is within an optimal operation range for the system.

The predetermined threshold value or values for the PID used within the comparison can differ within examples. In some instances, the predetermined threshold value for the PID may depend on multiple factors. In addition, the computing system may use multiple predetermined threshold values or ranges for the comparison with the current value of the PID in some examples.

In some examples, the predetermined threshold value for the PID may be based on a make and model of the vehicle 8. Different types of vehicles may have systems that perform differently. As a result, the computing system 2 may be configured to utilize one or more predefined values for the PID that are developed based on the make and model of the vehicle 8. In some examples, the computing system 2 may access these predefined values (e.g., the predefined values 67 shown in FIG. 6) from the server 4. In particular, the server 4 may develop the predefined values based on the analysis of numerous vehicles having the same make and model of the vehicle 8. Similarly, these predefined values may be set by the manufacturing of the particular make and model of the vehicle.

The predetermined threshold value for the PID may be based on a previously determined health of the vehicle system. The computing system 2 or another computing device may develop one or more predetermined threshold values for the PID based on one or more prior examinations of the health of the vehicle. This way, the computing system 2 may compare the current state of the system as indicated by the current value of the PID to a PID value that represents a recent condition of the system. By extension, in some instances, the predetermined threshold value for the PID may be configured during a most recent servicing of the vehicle system. For example, a user (e.g., a technician) may set one or more values for the PID based on the state of the system during repairs. As a result, the user may predefine thresholds that serve as alerts for when to check or replace a vehicle system.

The comparison may use one or more values for the PID that depend on a general condition of the vehicle 8. For instance, the computing system 2 may compare the current value of the PID to a predetermined threshold value for the PID that is based on a current mileage of the vehicle 8.

In some examples, the computing system 2 may perform multiple comparisons. For instance, the computing system 2 may compare the current value of the PID to a first predefined threshold value for the PID. Based on the results of the comparison, the computing system 2 may then compare the current value of the PID to a second predefined threshold value for the PID. For instance, the computing system 2 may utilize a first comparison that indicates whether the system is operating within a healthy range. If the computing system 2 determines that the system is not within the healthy range, the computing system 2 may use a second comparison to determine if the vehicle system requires repair or replacement.

Block 210 includes determining a health of the particular system of the vehicle such that the health reflects a difference between the current value and the predetermined threshold value for the PID. As indicated above, the comparison may enable the computing system 2 to compare the current value of the PID to one or more predefined values for the PID. This comparison may indicate whether the current value of the PID is within an optimal range for operation.

In some examples, the computing system 2 may determine the health of a system of the vehicle such that the health represents a numerical difference between the current value and the predetermined threshold value for the PID. Similarly, the computing system 2 may determine the health of a system of the vehicle system such that the health represents a percentage difference between the current value and the predetermined threshold value for the PID.

Block 212 includes displaying, at a graphical interface, a vehicle health record representing the health of the particular system of the vehicle. The vehicle health record may convey the health of one or more vehicle systems in various formats within examples, such as a GUI that includes vehicle graphics, graphs, colors, text, and other elements configured to display health information related to vehicle systems. These various elements of the GUI may be selectable to enable a user to navigate a variety of information associated with the generated vehicle health record.

In some examples, the computing system 2 may display the health of a system of the vehicle in a graphic that indicates the numerical difference between the current value and the predetermined threshold value for the PID. The graphic may include an indication of the system.

The computing system 2 may perform the comparison and determine that the current value of the PID is above a predetermined threshold value for the PID that represents a lower bound threshold for the PID. As such, the computing system 2 may display an indication that conveys the system is within a desired health range. In one respect, a desired health range can be a range in which a value associated with a PID does not set a DTC. In another respect, a desired health range can be a range in which a value associated with a PID (e.g., a VCP) indicates a vehicle system is within an OEM specified operating range (e.g., desire tire pressure values). The computing system 2 may specify that the system is healthy and does not require immediate attention (e.g., repair or replacement). Alternatively, the comparison may indicate that the current value of the PID is below a predetermined threshold value for the PID that represents a lower bound threshold. With the current value of the PID falling below the lower bound threshold, the computing system 2 may include an alert in the vehicle health record that indicates that the system requires maintenance. This way, the vehicle health record may clearly show that the system is not within an ideal range for operation and attention may be required (e.g., repair or replacement).

The computing system 2 may perform the comparison and determine that the current value of the PID is below a predetermined threshold value for the PID that represents an upper bound threshold for the PID. As such, the computing system 2 may display an indication that conveys the system is within a desired health range. Particularly, the computing system 2 may specify that the system is healthy and does not require immediate attention (e.g., repair or replacement) within the vehicle health record. Alternatively, the comparison may indicate that the current value of the PID is above the upper bound threshold. As a result, the computing system 2 may include an alert in the vehicle health record that indicates that the system requires maintenance. This way, the vehicle health record may clearly show that the system is not within an ideal range for operation and attention may be required (e.g., repair or replacement).

The set 200 can further include identifying a second set of parameters corresponding to a second PID representing the state of the particular system of the vehicle and determining, using the second set of parameters, a second current value of the second PID. The set 200 can also include performing a second comparison between the second current value and a second predetermined threshold value for the second PID. As such, determining the health of the particular system may be further based on the second comparison between the second current value and the second predetermined threshold value for the second PID.

In some examples, the set 200 may further include performing a functional test script prepared for the vehicle. In particular, performing the functional test script may include requesting the vehicle to perform one or more functional tests and requesting PID parameters from the vehicle in a predefined order in relation to requesting the vehicle to perform one or more functional tests. In some instances, at least a portion of the one or more sets of parameters are received in response to requesting PID parameters from the vehicle in the predefined order. In some examples, at least the portion of the one or more sets of parameters may include reactionary PIDs indicative of whether the one or more functional tests passed or failed. The health of the particular system of the vehicle may further reflect whether a functional test pertaining to the particular system passed or failed. As an example, a functional test associated with a reactionary PID may include an enable air conditioning compressor on, enable heating, ventilation, and air conditioning (HVAC) fan on, enable ABS pump on. Other examples of such a functional test are also possible.

In some examples, the computing system 2 can be coupled to the vehicle during performance of one or more blocks of the set 200. Particularly, the computing system 2 can be coupled to the vehicle via a wired connection or a wireless connection. In some instances, the computing system 2 can be coupled to the vehicle during a subset of the blocks of the set 200.

In further examples, the computing system 2 can programmatically perform one or more functional tests on the vehicle 8. For example, the computing system 2 can perform one or more functional tests after a test drive of the vehicle 8. The functional tests performed by the computing system 2 can depend on certain conditions detected by the computing system 2 during the test drive. The computing system 2 could be configured to initiate one or more functional tests upon detecting the completion of the test drive and in response to determining that the vehicle 8 is in a state suitable for the functional tests.

In some examples, the computing system 2 can perform one or more functional tests during a test drive of the vehicle 8. For example, prior to the test drive, the computing system 2 can display a list of one or more functional tests to be performed during the test drive if the computing system 2 detects certain conditions. In this way, a driver of the vehicle can be made aware of which functional test(s) may be performed to avoid being surprised during the test drive. The certain conditions detected by the computing system 2 can include precautionary conditions that ensure the functional tests are performed safely. For example, the computing system 2 could require the vehicle 8 to be in an initial state before starting and performing a functional test (e.g., the vehicle 8 is stationary with the brakes applied). The initial state of the vehicle 8 required by the computing system 2 before performing a functional test could depend on the type of functional test performed. As such, the computing system 2 can be configured to stop performing a functional test upon detecting a change in the conditions that permits the performance of the functional (e.g., the brakes are no longer applied). The conditions can depend on sensor data from a variety of vehicle sensors or other types of sensors communicating with the computing system 2.

In addition, the computing system 2 can include a prompt to have the driver acknowledge the functional test(s) to be performed during the test drive prior to performing the functional test(s). Furthermore, the computing system 2 can be programmed such that a functional test would not be performed during a test drive when certain conditions are met (e.g., the vehicle is in motion). System software associated with the computing system 2 (e.g., instructions of the CRPI 28) can drop flags during the test drive that enable a user to review the software-initiated flags after completion of the test drive. In addition, the computing system 2 may initiate a functional test based on sensor data. For example, the computing system 2 may review and analyze sensor data and PID data (e.g., a PID threshold breach) to determine a functional test to perform. In some examples, the computing system 2 can perform a mass air flow sensor test, power on or off headlights, and/or power on or off other sensors, such as cameras, microphones, etc.

In further examples, capturing information regarding operation of one or more systems may involve a sensor or sensors analyzing wheel speed PIDs and identifying when one or more PIDs vary by a significant amount (e.g., a threshold speed). These measurements may enable a user to subsequently detect vehicle turns during review of PIDs or when tires on the vehicle have different sizes possibly due to improper tire inflation or wear.

Figure 12:
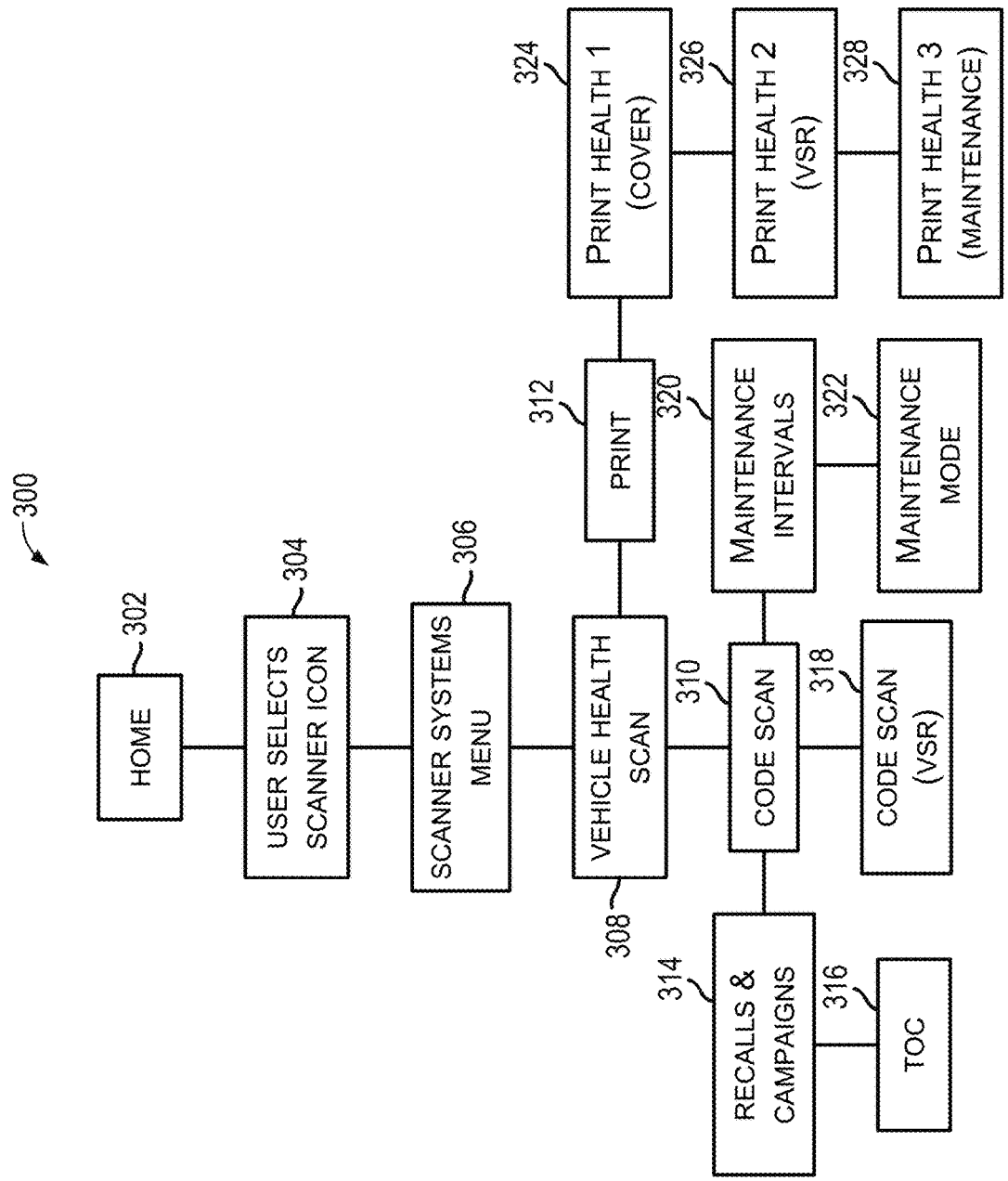
FIG. 12 illustrates another flowchart for implementing a vehicle health record in accordance with one or more example embodiments.

FIG. 12 is a flowchart depicting a process for generating an example vehicle health record. The flowchart includes a set of steps 300. A computing system (e.g., the computing system 2) or the server 4 may perform one or more steps of the set of steps 300 to generate a vehicle health record that conveys the current health of one or more systems of a vehicle (e.g., the vehicle 8). In some examples, performance of one or more steps of the set of steps 300 may contribute to the development of a vehicle health record. The vehicle health record may represent a compilation of a series of vehicle health analyses performed on the vehicle over time. As a result, the vehicle health record may represent historical information regarding the health of different vehicle systems as well as related maintenance history for the vehicle systems. Within examples, the steps 300 may be performed in various orders. In addition, performance of a step may occur automatically by the computing system 2 or in response to a selection by a user at an interface of the computing system 2.

Block 302 involves a home option. The home option may represent a start screen of an interface (e.g., a GUI) that the computing system 2 provides to a user to initiate development of a vehicle health record. In some examples, the home option may enable a user to provide information related to the vehicle, such as the vehicle identification number (VIN), one or more images of the vehicle, and user information, among other information. The home option may include selectable icons that allow a user to trigger the computing system 2 or another device (e.g., the server 4) to perform actions related to measuring health aspects of vehicle systems. In addition, the home option may also enable the user to review information previously generated related to the health of the vehicle 8.

Block 304 involves a user selecting the scanner icon. From the home option, the user may cause the computing system to initiate a scan of the vehicle 8 by a selection of a scanner icon using an interface of the computing system 2. In some instances, the computing system may be configured to automatically perform the scan in response to being connected to the vehicle 8. As such, selection of the scanner may bring up a scanner systems menu as represented at block 306. The scanner systems menu may offer one or more options related to scanning the vehicle for health-related information (e.g., vehicle diagnostic information). As such, these options may be displayed within the scanner systems menu. From the scanner systems menu, the user may select a vehicle health scan as represented at block 308. Selection of the vehicle health scan at block 308 may trigger the computing system to perform a health scan of the vehicle, which may involve accessing vehicle diagnostic information from the vehicle 8 via a wired or wireless connection between the computing system 2 and the vehicle 8. For instance, the health scan may enable the computing system to obtain PIDs that convey vehicle system health-related information. Block 310 involves performing a code scan. In at least some implementations, performing the code scan can include the computing system requesting a status of DTC set in one or more ECU in the vehicle 8. In some instances, the code scan may involve pulling codes and showing status of readiness monitors associated with the vehicle. The code scan may enable the computing system to determine a synopsis of vehicle information.

Block 314 involves the computing system 2 obtaining recall and campaign information related to the vehicle. The computing system may access recall and campaign information using an Internet connection, from a database (e.g., the server 4), or from another source. By accessing this information, the computing system may alert the user of any recent related recall or campaign that may impact the performance of the vehicle. Block 316 involves the computing system determining a table of contents (TOC). The TOC may enable a user to quickly review information related to the vehicle.

Selection of the code scan (VSR) at block 318 may trigger the computing system 2 to perform a code scan to implement a vehicle summary report. When developing the vehicle health record, the computing system 2 may be configured to analyze the health of different vehicle systems using one or more processes described herein. As such, the computing system 2 may determine and prepare maintenance intervals at block 320. The maintenance intervals may compare the current mileage of the vehicle's odometer and indicate which vehicle systems (if any) may require some form of review or repair (e.g., rotation, changing, replacement) at what future mileage. The estimation may be based on previous set mileages, past trends derived from analyzing each vehicle system in one or more similar vehicles, or other information. In addition, the computing system 2 may also provide maintenance mode at block 322. The maintenance mode 322 may involve setting vehicle computing systems into a particular maintenance mode that enables a technician to review additional information related to operation of vehicle systems.

In addition to the generation of a vehicle health record that conveys the health of one or more vehicle systems, the computing system 2 may also enable a user to print the vehicle health record at block 312. Printing may involve printing one or more pages of the vehicle health record (blocks 324, 326, 328) to enable a user to review the vehicle health record in a tangible form. For instance, a technician may utilize the print option to provide customers with a print out of the vehicle health record that allows the customers to carefully review any or all of the information to make subsequent maintenance decisions for the vehicle 8. In addition, the print option may involve displaying the vehicle health record using one or more GUIs on one or more display interfaces. In some examples, the computing system 2 may also include another option configured to display the vehicle health record.

FIG. 13A and FIG. 13B illustrate example PIDs that can be used to analyze the health of vehicle systems. These PIDs represent example PIDs that can be identified using VDI to analyze the health of various vehicle systems, such as the brakes, tires, and engine. Other examples may include other PIDs that can be used to generate a vehicle health record.

FIG. 13A illustrates examples PIDs that can be used to analyze the health of vehicle systems for a first vehicle. Particularly, the first vehicle is shown as a 2013 Chevrolet Avalanche 5.3L as shown in header 332 of the table 330. The list of PIDs further includes an ID column 334, a vehicle system column 336, a data list title column 338, a PID name column 340, a condition column 342 associated with the vehicle system, and vehicle information column 344 about the first vehicle.

The ID column 334 may be used to organize the various PIDs. As shown in FIG. 13A, the ID column uses numbers increasing in numerical order to organize the PIDs. The vehicle system column 336 conveys the vehicle system associated with the PID represented by the information in the row of the table. In the example shown in FIG. 13A, the vehicle system column 336 includes various vehicle systems, such as antilock brakes, instrument panel cluster, service (engine oil) interval reset, tire pressure monitor, and transmission. Some of these vehicle systems are associated with multiple PIDs in the table. The data list title column 338 provides the various types of data associated with each PID, such as ABS data, signal data, data, service data, tire pressure data (TPM) data, and Trans Data.

The PID name column 340 conveys various PID names associated with each PID. A PID name may provide a description of the information associated with the PID, such as a washer fluid level, engine oil life remaining, etc. In some examples, the PID names may be modified by a user. The condition column 342 indicates the health aspect of a vehicle system represented by the PID in each row of the table 330. The vehicle information column 344 conveys vehicle information associated with the first vehicle, including the year, make, model, and engine type.

FIG. 13B illustrates examples PIDs that can be used to analyze the health of vehicle systems for a second vehicle. Particularly, the second vehicle is shown as a 2012 Chevrolet Silverado 6.0L as shown in header 352 of the table 350. The list of PIDs further includes an ID column 354, a vehicle system column 356, a data list title column 358, a PID name column 360, a condition 362 associated with the vehicle system, and vehicle information 364 about the second vehicle. These columns are organized and convey information similar to the columns described with respect to the table 330 shown in FIG. 13A.

Figure 14:
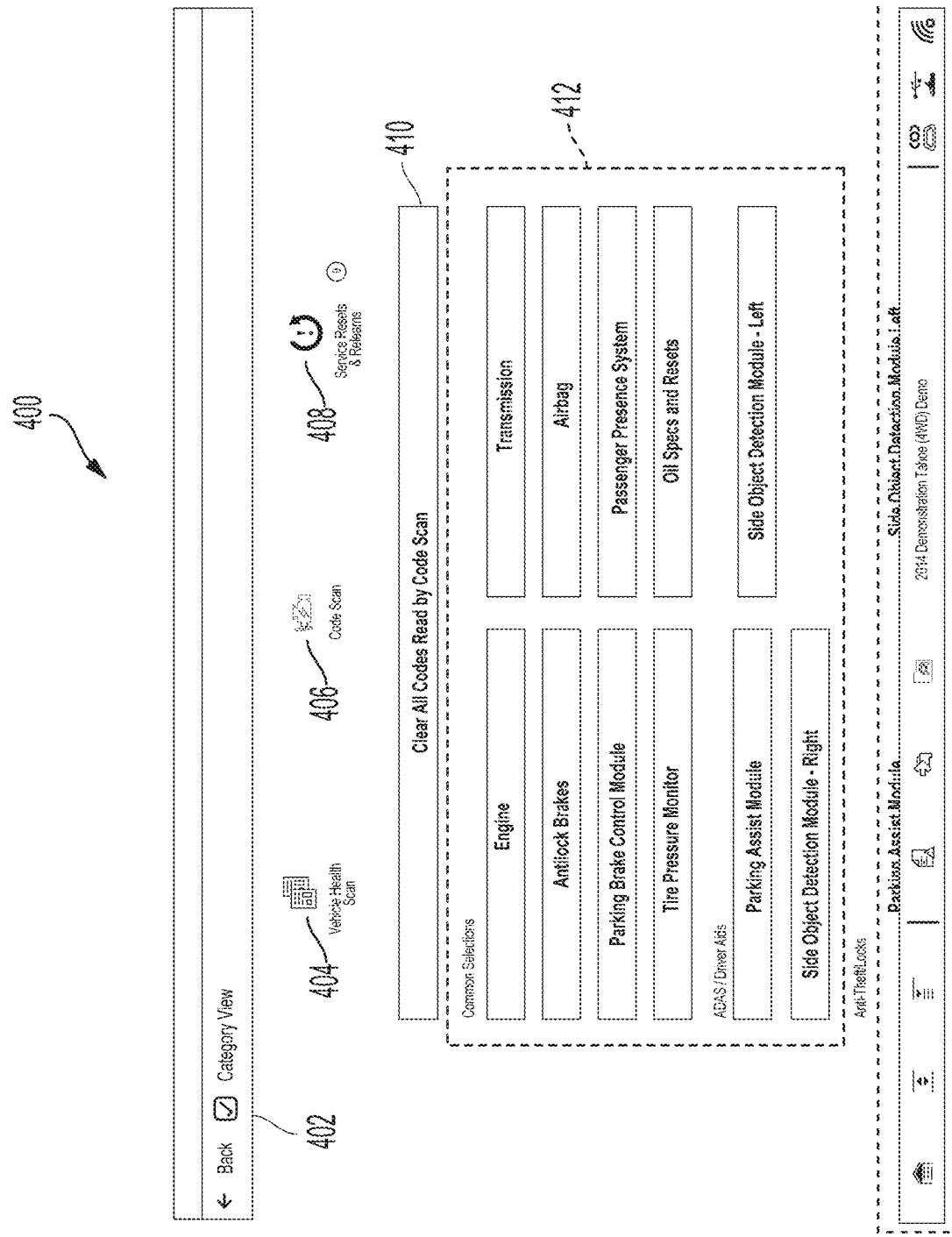
FIG. 14 is a graphical user interface for implementing vehicle health record options in accordance with one or more example embodiments.

FIG. 14 is an example graphical user interface for displaying a vehicle health record. The graphical user interface (GUI) 400 includes different visual elements that are selectable by a user. Particularly, the GUI 400 includes a top tool bar 402, a vehicle health scan option 404, a code scan option 406, and a service resets & relearns option 408. In addition, the GUI 400 also shows a clear all codes read by code scan option 410, a common selections section 412, and a bottom tool bar 414. In some examples, the GUI 400 may correspond to the home option 302 shown in FIG. 12.

The GUI 400 represents a visual display that the computing system 2 may display for a user to use to review the health of one or more vehicle systems of a vehicle 8. Particularly, each element of the GUI 400 (and other GUIs described herein) may be selectable using an input interface associated with the display interface displaying the GUI 400. For instance, elements of the GUI 400 may be selected via a touch screen interface, a mouse, a keyboard, audio inputs, or other means of selection. As such, these elements may enable user-selectable control that can trigger actions by the computing system 2 in response to a user selection.

In addition, the elements are shown in FIG. 14 arranged in an example format in the GUI 400. Other examples may include more or fewer elements arranged in other configurations. The computing system may be configured to enable a user to customize the layout of elements included within the GUI 400.

The top tool bar 402 represents a menu that enables the user to navigate options associated with the GUI 400 and other GUIs associated with a vehicle health record for the vehicle 8. As shown, the top tool bar 402 currently shows elements in a category view. The top tool bar 402 also includes a back option that may enable the user to return to another menu (e.g., a login menu, a home screen menu).

The vehicle health scan option 404 represents a selectable graphic that the user may select to initiate the performance of a health scan of the vehicle 8. In some instances, selection of the vehicle health scan option 404 may cause the computing system 2 to receive vehicle diagnostic information from the vehicle 8 when connected to the vehicle 8. Alternatively, selection of the vehicle health scan option 404 may also be configured to cause the computing system 2 to display results associated with a prior vehicle health scan. In some examples, the computing system 2 may be coupled to the vehicle 8 to receive vehicle diagnostic information in response to the selection of the vehicle health scan option 404. Selection of the health scan option 404 may cause the computing system 2 to scan one or more PIDs (e.g., one or more VCPs) that can be used to evaluate the health of one or more vehicle systems.

In response to a detection of the vehicle health scan option 404 or other options presented, the computing system 2 may detect one or more PIDs associated with a selected option (e.g., the vehicle health scan option 404). The computing system 2 may generate a VDM to request one or more PIDs for a particular vehicle coupled to the scanner (e.g., the computing system 2). The computing system 2 may transmit the VDM(s) and receive VDI in response that includes one or more PIDs (e.g., VCPs).

The code scan option 406 represents another selectable graphic that the user may select to perform a code scan of the vehicle 8. Selection of the code scan option 406 may cause the computing system 2 to receive diagnostic codes from the vehicle 8 when connected to the vehicle 8. Alternatively, selection of the code scan option 406 may also be configured to cause the computing system 2 display results associated with a recent code scan of the vehicle 8. In some instances, selection of the code scan option 406 may cause the computing system 2 to request one or more DTCs. In some examples, the code scan option 406 may enable the computing system 2 to obtain DTCs while the health scan option 404 may enable the computing system 2 to obtain PIDs, such as PIDs conveying information related to vehicle systems health.

The service resets & relearns option 408 represents a selectable graphic that the user may select to display information related to service resets and service relearns. Selection of this option may enable a user to recalibrate levels associated with particular vehicle systems. For instance, a user may utilize this option to adjust levels to the current health of one or more vehicle systems. The resets and relearns may enable the vehicle systems to be reset and indications be included to specify that changes were made.

The clear all codes read by code scan option 410 may represent a selectable option that can enable a user to clear codes previously captured by execution of a code scan by the computing system 2. For instance, the computing system 2 may be configured to clear the existing vehicle diagnostic information stored at the computing system 2 in order to prepare for a subsequent scan.

The common selections section 412 shows different options that are often selected by users utilizing the GUI 400. Particularly, the common selections section 412 is shown with commonly analyzed systems of a vehicle, including engine, transmission, antilock brakes, airbag, parking brake control module, passenger presence system, tire pressure monitor, and oil life. In addition, the common selections section 412 also includes ADAS/Driver Aids options, such as parking assist module, side object detection module left and right. In other examples, other systems may be included within the common selection section 412. For instance, a user may be able to program which systems are included within the common selection section 412. Alternatively, the common selection section 412 may display systems that have been frequently analyzed by the computing system 2.

The bottom tool bar 414 includes additional options that a user may select when analyzing the health of a vehicle. As such, a user may use the additional options to navigate through the information captured and provided by the computing system 2.

Figure 15:
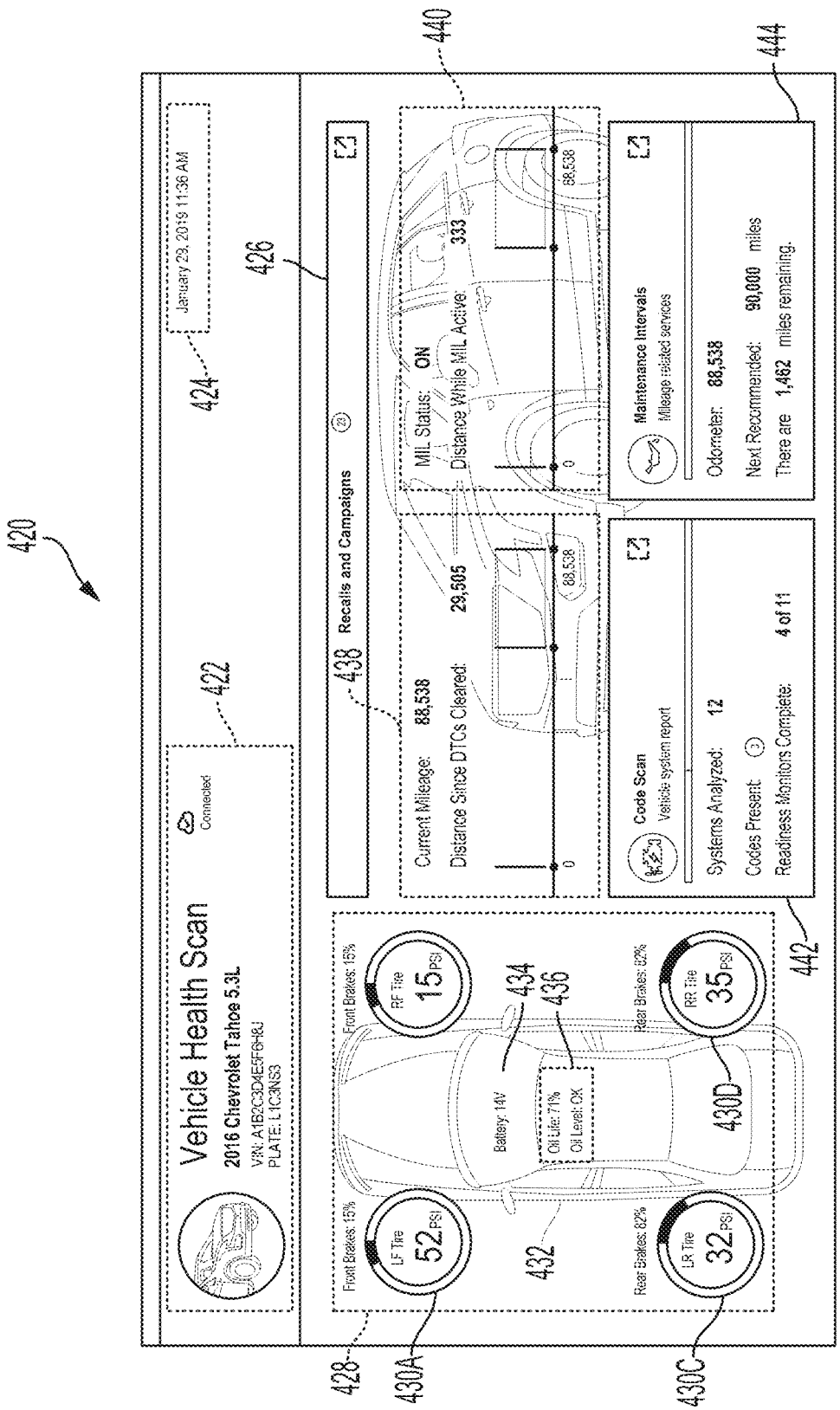
FIG. 15 is another graphical user interface for implementing vehicle health record options in accordance with one or more example embodiments.

FIG. 15 is another example graphical user interface for displaying a vehicle health record. The GUI 420 represents an example vehicle health record that includes several elements providing health and maintenance information regarding the vehicle 8. As such, one or more of these elements may be selectable by a user when analyzing the health of the vehicle 8. In addition, a screenshot of the GUI 420 may be printable and provided to a customer for review. Similar to the GUI 400 shown in FIG. 14, the GUI 420 may have other arrangements with more or fewer elements in examples. In addition, the computing system 2 may be configured to enable a user to customize the arrangement and options available for the GUI 420. In some examples, the GUI 400 and GUI 420 may be representative of information related to the same vehicle health record.

As shown in FIG. 15, the GUI 420 includes vehicle information 422 and date and time 424 in a header format. In addition, the GUI 420 also includes a recalls and campaigns option 426, vehicle health graphics 428 configured to visually represent health aspects of the vehicle 8, current mileage information 438, malfunction indicator lamp (MIL) information 440, code scan information 442, and maintenance interval information 444. In other examples, the GUI 420 may convey other information using one or more selectable graphics enabling user-selectable control.

The vehicle information 422 specifies "Vehicle Health Scan" to inform a reader about the information contained therein. As shown, the vehicle information 422 may include a picture of the vehicle 8. This picture can confirm to the user that the vehicle health record represents information regarding a particular vehicle. In addition, the vehicle information 422 also specifies the make, model, and year of the vehicle (e.g., 2016 Chevrolet Tahoe 5.3L). The vehicle information 422 may also specify the vehicle identification number (VIN) and license plate number associated with the vehicle 8. As indicated, the header of the GUI 420 also includes the date and time (e.g., Jan. 29, 2019 11:36 AM). The date and time may represent when the vehicle summary shown by the GUI 420 was generated.

The recalls and campaigns option 426 represents a selectable element that may be selected by a user to show recalls and campaigns associated with the vehicle 8. The association between the recalls and campaigns may be based on the particular make, model, and year, a specific part manufacturer, or another connection. As such, the computing system 2 may obtain the recalls and campaigns information from other sources (e.g., the server 4). As a result, the computing system 2 may provide current information regarding recalls and campaigns for the vehicle 8.

The vehicle health graphics 428 are included within the GUI 420 to depict the current health of different vehicle systems. The vehicle health graphics 428 can be used to provide health-related information in a clear and concise format. As such, the health graphics may utilize charts, images, colors, and other features to indicate the health status for various vehicles systems. As shown in FIG. 15, the vehicle health graphics 428 in the GUI 420 include a vehicle graphic 432 to serve as a guide for positioning other vehicle health graphics relative to the actual positions of vehicle systems. This way, the health information determined during analysis of PID values relative to predefined values may be conveyed to a user in an easy to understand format. Although the vehicle graphic 432 is shown as a car, the vehicle graphic 432 may be customizable within examples. For instance, the vehicle graphic 432 may reflect that physical structure of the vehicle 8 associated with the vehicle health record.

In addition, the vehicle graphic 432 is shown with additional graphics, such as four tire and brake graphics 430A, 430B, 430C, 430D, a battery graphic 434, and oil graphic 436. The tire and brake graphics 430A-430D each represent the current condition (i.e., health) of the tire and corresponding brake pad at the tire. For instance, the tire and brake graphic 430A includes an indication that the front left tire currently has a 52 PSI and the front left brake has 15% brake pad remaining.

The code scan information 442 is a selectable option that provides information about the quantity of vehicle systems analyzed (e.g., 12 systems analyzed), the quantity of codes present (e.g., 3 codes present), and the quantity of readiness monitors complete (e.g., 4 of 11). These codes may be selectable to review further information regarding the vehicle. In some instances, the code scan information 442 may be displayed on a display interface.

The maintenance intervals information 444 may convey information related to mileage related services. As such, the maintenance intervals information 444 may indicate the current number of miles of the vehicle's odometer along with a suggested mileage for performing the next health code scan. In addition, the maintenance interval information 444 may indicate the quantity of miles remaining until the next suggested mileage for performing a subsequent health code scan.

Figure 16:
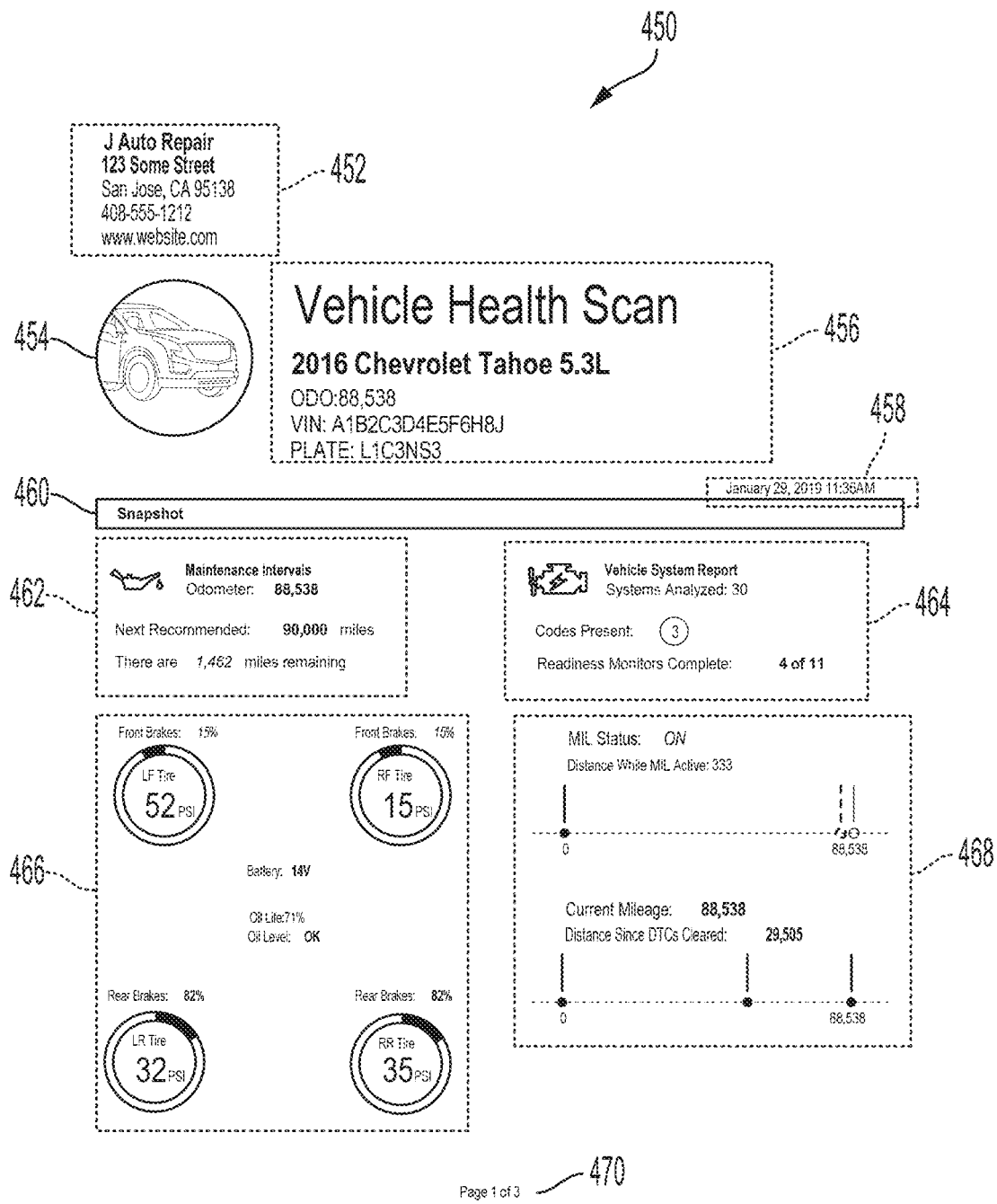
FIG. 16 is another graphical user interface for implementing vehicle health record options in accordance with one or more example embodiments.

FIG. 16 is an additional example graphical user interface for displaying a vehicle health record. Similar to the GUI 420, the GUI 450 is shown with a header that includes repair shop information 452, a vehicle graphic 454, vehicle information 456, and a date and time 458. In addition, the GUI 450 includes a snapshot 460 that includes various elements expressing the health of the vehicle 8. Particularly, the snapshot 460 includes maintenance interval information 462, a vehicle system report 464, a set of vehicle health graphics 466, and MIL status information 468. The GUI 450 also includes a page number 470 to convey the number of pages associated with the vehicle health record. As such, the GUI 450 may be part of a vehicle health record with one or more other GUIs described herein.

Figure 17:
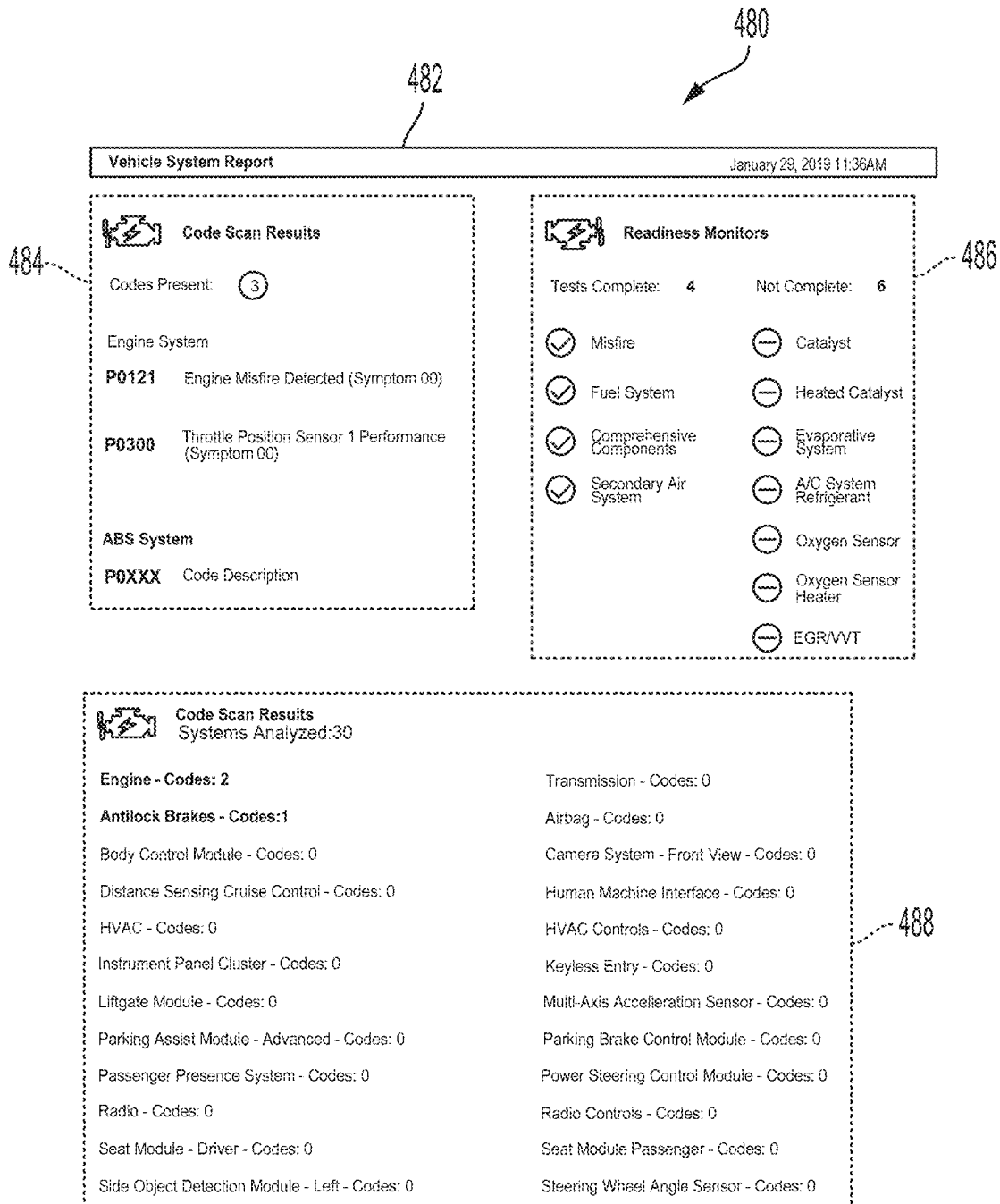
FIG. 17 is an additional graphical user interface for implementing vehicle health record options in accordance with one or more example embodiments.

FIG. 17 is a further example graphical user interface for displaying a vehicle health record. The GUI 480 represents another example visual display that includes elements to display the health of the vehicle 8. Particularly, the GUI 480 includes a vehicle system report header 482 that includes a corresponding time and date (e.g., Jan. 29, 2019 11:36 a.m.). In addition, the GUI 480 shows a code scan results 484 that indicates a quantity of codes present and code information related to one or more systems of the vehicle 8. The GUI 480 also shows readiness monitors 486 with the quantity of tests and test information. The GUI 480 further shows the code scan results 488 and a page number 490.

Figure 18:
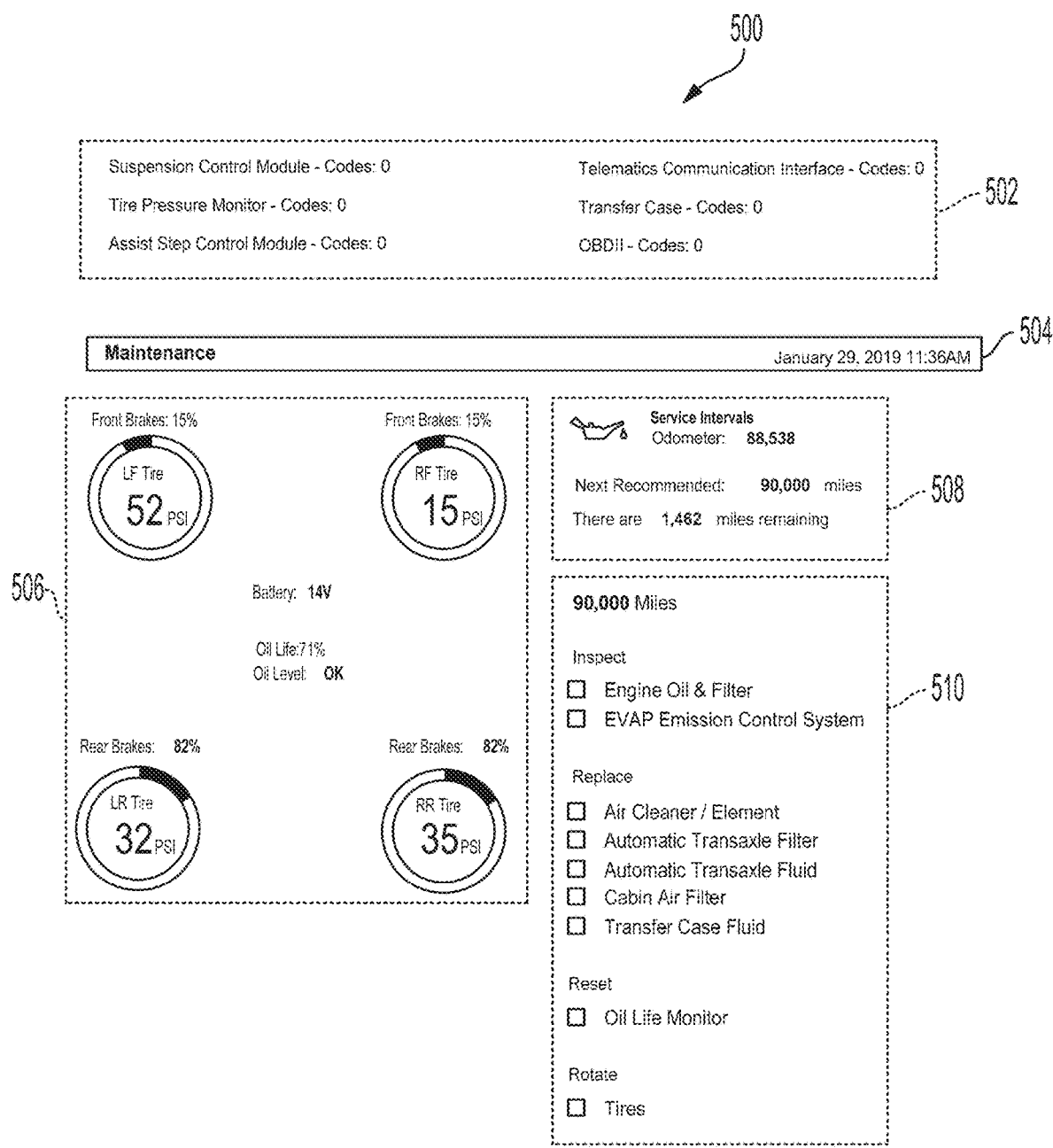
FIG. 18 is a further graphical user interface for implementing vehicle health record options in accordance with one or more example embodiments.

FIG. 18 is another example graphical user interface for displaying a vehicle health record. The GUI 500 represents a further example visual display that includes selectable elements configured to display the health of the vehicle 8. As shown in FIG. 18, the GUI 500 includes code information 502, a header 504, vehicle health graphics 506, service interval information 508, and suggested maintenance 510.

The code information 502 represents different codes that may have been obtained during a vehicle code scan by the computing system 2. As shown, the code information may include different types of codes, such as suspension control module codes, tire pressure monitor codes, assist step control module codes, telematics communication interface codes, transfer case codes, and OBDII codes. In the example shown in FIG. 18, all these codes are shown at zero "0", but can have other values during the health analysis of a vehicle. In addition, other codes may be listed within embodiments.

The header 504 includes an indication of maintenance for the vehicle and the date and time of the analysis (i.e., Jan. 29, 2019, 11:36 AM). This way, a user may understand the information provided within the GUI 500 corresponds to maintenance of the vehicle and the date and time that the vehicle health record was generated. As such, the header 504 can convey other information within examples.

The vehicle health graphics 506 include graphics and information conveying the health of different vehicle systems analyzed during the health check. For instance, the vehicle health graphics 506 may represent information obtained from one or more VCPs, such as fluid levels, wear levels, and user adjustable parameters (e.g., tire pressure). Particularly, the vehicle health graphics 506 is shown with health graphics conveying information for the front and rear brakes, each tire pressure, the battery, and the oil system for the vehicle. More specifically, the front brakes are shown to be in a zone requiring replacement at a 15 percent level. Thus, when a scale of 0-100 with 100 representing brand new brakes is used by the GUI 500, the 15 percent level may indicate that the front brakes require new brake pads or some other form of adjustment. In addition, the graphic may use a color (e.g., red) to indicate that these brakes require attention. Conversely, the rear brakes are shown to be in a healthy zone at an 82 percent level. To convey that these brakes are currently in a non-maintenance required zone (i.e., healthy zone), the GUI 500 may use a color for the percentage that indicates the brakes are in a good range (e.g., green). In addition, the health of the front brakes and the rear brakes are also indicated using circular graphics that convey the overall health of each brake set. Each tire's PSI is listed as a numerical value and may use colors that indicate whether the numerical value is in a healthy zone or not (e.g., green represents that the PSI is in an optimal zone and red represents that the PSI is too high or low). The battery voltage is listed and the oil system's health is conveyed with an oil life percentage (e.g., 71 percent) and whether the oil level is good or requires attention (e.g., oil level: OK). This health information for these vehicle systems may be represented in other graphics within examples.

The service interval information 508 may indicate the current level of the vehicle's odometer (e.g., 83,538 miles). The current level of the odometer may also be used to further display the next recommended quantity of miles that the vehicle should be checked again (e.g., 90,000 miles). As a result, the GUI 500 may be used to convey a recommendation to a user when the vehicle should be serviced next. In addition, the suggested maintenance 510 includes recommendations for reviewing the health of the vehicle at the suggested mileage of the odometer. Each section may include boxes for the user or a technician to mark off as part of the recommendation or upon completion. In the example shown in FIG. 18, the suggested maintenance 510 can include one or more of an inspection section, a replace section, a reset section, and a rotate section, among other possible examples. The inspection section indicates the engine oil and filter and the EVAP emission control system may need to be inspected at the 90,000 mile mark. The replace section indicates that the air cleaner/element, the automatic transaxle filter, the automatic transaxle, fluid, the cabin air filter, and the transfer case fluid may be due for replacement at the 90,000 mile mark. The reset section indicates the oil life monitor may need to be reset at the 90,000 mile mark. The rotate section indicates that the tires are may need to be rotated at the 90,000 mile mark. In other examples, other vehicle systems and maintenance techniques may be included.

IV. Conclusion

Example embodiments have been described above. Those skilled in the art will understand that changes and modifications can be made to the described embodiments without departing from the true scope and spirit of the present invention, which is defined by the claims. For instance, although many of the example embodiments are described with respect to a vehicle and a vehicle service tool, the person skilled in the art will understand that the vehicle referred to herein can be replaced by some other serviceable device such as, but not limited to, medical equipment, appliances (e.g., refrigerators or washing machines), or televisions. In such instance, the vehicle service tools described herein can be referred to more simply as a "service tool."

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all or a portion of the program instructions of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein is for the purpose of describing particular embodiments, and is not intended to be limiting.

In this description, the articles "a," "an," and "the" are used to introduce elements and/or functions of the example embodiments. The intent of using those articles is that there is one or more of the introduced elements and/or functions. The intent of using the conjunction "or" within a described list of at least two terms is to indicate any one of the listed terms or any combination of two or more of the listed terms.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising A, B, and/or C, or at least one of A, B, and C, or one or more of A, B, and C is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

Embodiments of the present disclosure may thus relate to one of the enumerated example embodiments (EEEs) listed below.

EEE 1 is a method comprising: receiving, at a computing system, vehicle diagnostic information from a vehicle, wherein the vehicle diagnostic information includes one or more sets of parameters corresponding to parameter identifiers (PIDs); identifying a first set of parameters corresponding to a PID representing a state of a particular system of the vehicle; determining, using the first set of parameters, a current value of the PID; performing a comparison between the current value and a predetermined value for the PID; determining a health of the particular system of the vehicle such that the health reflects a difference between the current value and the predetermined value for the PID; and displaying, by the computing system at a graphical interface, a vehicle health record representing the health of the particular system of the vehicle.

EEE 2 is the method of EEE 1, wherein receiving vehicle diagnostic information from the vehicle comprises: receiving one or more diagnostic trouble codes from the vehicle; and wherein identifying the first set of parameters corresponding to the PID representing the state of the particular system of the vehicle comprises: identifying the first set of parameters corresponding to the PID based on the one or more diagnostic trouble codes from the vehicle.

EEE 3 is the method of any one of EEE 1 and 2, wherein the predetermined value for the PID is based on a make and model of the vehicle.

EEE 4 is the method of any one of EEE 1 to 3, wherein the predetermined value for the PID is based on a previously determined health of the particular system.

EEE 5 is the method of any one of EEE 1 to 4, wherein the predetermined value for the PID is configured during a most recent servicing of the particular system.

EEE 6 is the method of any one of EEE 1 to 5, wherein receiving vehicle diagnostic information from the vehicle is performed responsive to the vehicle navigating at a particular altitude range; and wherein the predetermined value for the PID is based on the particular altitude range.

EEE 7 is the method of EEE 6, wherein displaying the vehicle health record representing the health of the particular system of the vehicle comprises: displaying the vehicle health record representing the health of the particular system of the vehicle with an indication of the particular altitude range.

EEE 8 is the method of any one of EEE 1 to 7, wherein the particular system of the vehicle corresponds to an engine of the vehicle; and wherein the predetermined value for the PID is based on a current mileage of the vehicle.

EEE 9 is the method of any one of EEE 1 to 8, wherein the particular system of the vehicle corresponds to an oil system of the vehicle; and wherein the predetermined value for the PID is based on an indicator of a most recent oil change of the oil system of the vehicle and a quantity of miles that the vehicle has driven since the most recent oil change.

EEE 10 is the method of any one of EEE 1 to 9, wherein determining the health of the particular system of the vehicle such that the health reflects the difference between the current value and the predetermined value for the PID comprises: determining the health of the particular system of the vehicle such that the health represents a percent difference between the current value and the predetermined value for the PID.

EEE 11 is the method of EEE 10, wherein displaying the vehicle health record representing the health of the particular system of the vehicle comprises: displaying the health of the particular system in a graphic that indicates the percent difference between the current value and the predetermined value for the PID, wherein the graphic includes an indication of the particular system.

EEE 12 is the method of any one of EEE 1 to 11, wherein determining the health of the particular system of the vehicle such that the health reflects the difference between the current value and the predetermined value for the PID comprises: determining the health of the particular system of the vehicle such that the health represents a numerical difference between the current value and the predetermined value for the PID.

EEE 13 is the method of EEE 12, wherein displaying the vehicle health record representing the health of the particular system of the vehicle comprises: displaying the health of the particular system in a graphic that indicates the numerical difference between the current value and the predetermined value for the PID, wherein the graphic includes an indication of the particular system.

EEE 14 is the method of any one of EEE 1 to 13, further comprising: based on the comparison, determining that the current value of the PID is above the predetermined value for the PID, wherein the predetermined value for the PID represents a lower bound threshold for the PID; and wherein displaying the vehicle health record representing the health of the particular system of the vehicle comprises: displaying an indication that conveys the particular system is within a desired health range.

EEE 15 is the method of any one of EEE 1 to 14, further comprising: based on the comparison, determining that the current value of the PID is below the predetermined value for the PID, wherein the predetermined value for the PID represents a lower bound threshold for the PID; and wherein displaying the vehicle health record representing the health of the particular system of the vehicle comprises: displaying the vehicle health record with an alert indicating that the particular system requires maintenance.

EEE 16 is the method of any one of EEE 1 to 15, further comprising: based on the comparison, determining that the current value of the PID is below the predetermined value for the PID, wherein the predetermined value for the PID represents an upper bound threshold for the PID; and wherein displaying the vehicle health record representing the health of the particular system of the vehicle comprises: displaying an indication that conveys the particular system is within a desired health range.

EEE 17 is the method of any one of EEE 1 to 16, further comprising: based on the comparison, determining that the current value of the PID is above the predetermined value for the PID, wherein the predetermined value for the PID represents an upper bound threshold for the PID; and wherein displaying the vehicle health record representing the health of the particular system of the vehicle comprises: displaying the vehicle health record with an alert indicating that the particular system requires maintenance.

EEE 18 is the method of any one of 1 to 17, further comprising: identifying a second set of parameters corresponding to a second PID representing the state of the particular system of the vehicle; determining, using the second set of parameters, a second current value of the second PID; and performing a second comparison between the second current value and a second predetermined value for the second PID.

EEE 19 is the method of EEE 18, wherein determining the health of the particular system of the vehicle such that the health reflects the difference between the current value and the predetermined value for the PID is further based on the second comparison between the second current value and the second predetermined value for the second PID.

EEE 20 is the method of any one of 1 to 19, further comprising: performing a functional test script prepared for the vehicle, wherein performing the functional test script includes requesting the vehicle to perform one or more functional tests and requesting PID parameters from the vehicle in a predefined order in relation to requesting the vehicle to perform one or more functional tests, and wherein at least a portion of the one or more sets of parameters are received in response to requesting PID parameters from the vehicle in the predefined order.

EEE 21 is the method of any one of EEE 20, wherein at least the portion of the one or more sets of parameters include reactionary PIDS indicative of whether the one or more functional tests passed or failed, and wherein the health of the particular system of the vehicle further reflects whether a given functional test pertaining to the particular system passed or failed.

EEE 22 is a system comprising: a display interface and a computer device configured to to perform a set of functions, the set of functions comprising a method in accordance with any one of EEEs 1 to 21.

EEE 23 is a computer readable medium storing program instructions, that when executed by one or more processors, cause a set functions to be performed, the set of functions comprising a method in accordance with any one of EEEs 1 to 22.

What is claimed is:

1. A method comprising:
   receiving, at a computing system connected to a vehicle using a wired or wireless connection, vehicle diagnostic information from an electronic control unit within the vehicle, wherein the vehicle diagnostic information includes one or more sets of parameters corresponding to onboard diagnostic parameter identifiers (PIDs), wherein the one or more sets includes a first set of parameters corresponding to a first onboard diagnostic PID;
   identifying the first set of parameters corresponding to the first onboard diagnostic PID, wherein the first onboard diagnostic PID corresponds to a particular system of the vehicle;
   determining, from within the first set of parameters, a current value of a parameter corresponding to the first onboard diagnostic PID, wherein the current value of the parameter represents a state of the particular system;
   performing a comparison to determine a difference between the current value of the parameter and a predetermined value corresponding to the first onboard diagnostic PID, wherein the predetermined value represents an upper bound threshold corresponding to the first onboard diagnostic PID, wherein the difference represents
   a health of the particular system of the vehicle; and
   displaying, by the computing system at a display interface, a vehicle health record representing the health of the particular system of the vehicle via a graphic based on the particular system of the vehicle,
   wherein the graphic represents the particular system is within a desired health range when the current value of the parameter is below the predetermined value, and
   wherein the graphic represents the particular system requires maintenance when the current value of the parameter is above the predetermined value.

2. The method of claim 1, wherein receiving vehicle diagnostic information from the electronic control unit within the vehicle comprises:
   receiving one or more diagnostic trouble codes from the electronic control unit; and
   wherein identifying the first set of parameters corresponding to the first onboard diagnostic PID comprises:
   identifying the first set of parameters corresponding to the first onboard diagnostic PID based on the one or more diagnostic trouble codes from the vehicle.

3. The method of claim 1, wherein the predetermined value the first onboard diagnostic PID is based on a make and model of the vehicle.

4. The method of claim 1, wherein the predetermined value corresponding to the first onboard diagnostic PID is based on a previously determined health of the particular system.

5. The method of claim 1, wherein the predetermined value corresponding to the first onboard diagnostic PID is configured during a most recent servicing of the particular system.

6. The method of claim 1, wherein receiving vehicle diagnostic information from the electronic control unit within the vehicle is performed responsive to the vehicle navigating at a particular altitude range; and
   wherein the predetermined value corresponding to the first onboard diagnostic PID is based on the particular altitude range.

7. The method of claim 6, wherein displaying the vehicle health record representing the health of the particular system of the vehicle comprises:
   displaying the vehicle health record representing the health of the particular system of the vehicle with an indication of the particular altitude range.

8. The method of claim 1, wherein the particular system of the vehicle corresponds to an engine of the vehicle; and
   wherein the predetermined value corresponding to the first onboard diagnostic PID is based on a distance represented by an odometer of the vehicle.

9. The method of claim 1, wherein the particular system of the vehicle corresponds to an oil system of the vehicle; and
   wherein the predetermined value corresponding to the first onboard diagnostic PID is based on an indicator of a most recent oil change of the oil system of the vehicle and a distance that the vehicle has driven since the most recent oil change.

10. The method of claim 1, wherein
    the health of the particular system of the vehicle represents a percent difference between the current value and the predetermined value corresponding to the first onboard diagnostic PID.

11. The method of claim 10, wherein displaying the vehicle health record representing the health of the particular system of the vehicle comprises:
    displaying the health of the particular system in a graphic that indicates the percent difference between the current value and the predetermined value corresponding to the first onboard diagnostic PID, wherein the graphic includes an indication of the particular system.

12. The method of claim 1, wherein
    the health of the particular system of the vehicle represents a numerical difference between the current value and the predetermined value corresponding to the first onboard diagnostic PID.

13. The method of claim 12, wherein displaying the vehicle health record representing the health of the particular system of the vehicle comprises:
    displaying the health of the particular system in a graphic that indicates the numerical difference between the current value and the predetermined value corresponding to the first onboard diagnostic PID, wherein the graphic includes an indication of the particular system.

14. The method of claim 1, further comprising:
    based on the comparison, determining that the current value of the parameter is below the predetermined value corresponding to the first onboard diagnostic PID and above a second predetermined value corresponding to the first onboard diagnostic PID, wherein the second predetermined value corresponding to the first PID represents a lower bound threshold corresponding to the first onboard diagnostic PID; and wherein displaying the vehicle health record representing the health of the particular system of the vehicle comprises:

displaying an indication that conveys the particular system is within a desired health range.

15. The method of claim 1, further comprising:

based on the comparison, determining that the current value of the parameter is below a second predetermined value corresponding to the first onboard diagnostic PID, wherein the second predetermined value corresponding to the first onboard diagnostic PID represents a lower bound threshold corresponding to the first onboard diagnostic PID; and wherein displaying the vehicle health record representing the health of the particular system of the vehicle comprises:

displaying the vehicle health record with an alert indicating that the particular system requires maintenance.

16. The method of claim 1, further comprising:

identifying a second set of parameters corresponding to a second onboard diagnostic PID, wherein the second onboard diagnostic PID corresponds to the particular system of the vehicle;

determining, from within the second set of parameters, a current value of a second parameter corresponding to the second onboard diagnostic PID; and performing a second comparison to determine a difference between the current value of the second parameter and a second predetermined value corresponding to the second onboard diagnostic PID.

17. The method of claim 16, wherein the health of the particular system of the vehicle is further based on the difference between the current value of the second parameter and the second predetermined value corresponding to for the second onboard diagnostic PID.

18. The method of claim 1, further comprising:

performing a functional test script prepared for the vehicle, wherein performing the functional test script includes requesting the vehicle to perform one or more functional tests and requesting PID parameters from the vehicle in a predefined order in relation to requesting the vehicle to perform one or more functional tests, and wherein at least a portion of the one or more sets of parameters are received in response to requesting PID parameters from the vehicle in the predefined order.

19. The method of claim 18, wherein at least the portion of the one or more sets of parameters include reactionary PIDS indicative of whether the one or more functional tests passed or failed, and wherein the health of the particular system of the vehicle further reflects whether a given functional test pertaining to the particular system passed or failed.

20. The method of claim 1, further comprising:

coupling the computing system to the vehicle, wherein the computing system is a vehicle diagnostic tool having the display interface.

21. The method of claim 1, further comprising:

displaying a vehicle graphic that represents the vehicle; and wherein displaying the vehicle health record representing the health of the particular system of the vehicle via the graphic based on the particular system of the vehicle comprises:

displaying the graphic at a particular location on the vehicle graphic, wherein the particular location depends on the particular system of the vehicle.

22. The method of claim 1, wherein the predetermined value corresponding to the first onboard diagnostic PID further depends on distance driven since the particular system of the vehicle was last maintained.

23. The method of claim 1, further comprising:

receiving, from a remote computing system, the predetermined value corresponding to the first onboard diagnostic PID, wherein the remote computing is configured to determine trends based on vehicle health records for a plurality of vehicles and use the trends to generate the predetermined value corresponding to the first onboard diagnostic PID.

24. The method of claim 1, further comprising:

providing data that identifies the vehicle to a remote computing system;

receiving, from the remote computing system, a vehicle health record corresponding to the vehicle, wherein the remote computing system is configured to store vehicle health records for a plurality of vehicles; and modifying the vehicle health record based on the health of the particular system of the vehicle.

25. A system comprising:

a display interface;

a computing device configured to:

receive vehicle diagnostic information from an electronic control unit within a vehicle, wherein the vehicle diagnostic information includes one or more sets of parameters corresponding to onboard diagnostic parameter identifiers (PIDs), wherein the one or more sets includes a first set of parameters corresponding to a first onboard diagnostic PID;

identify the first set of parameters corresponding to the first onboard diagnostic PID, wherein the first onboard diagnostic PID corresponds to a particular system of the vehicle;

determine, from within the first set of parameters, a current value of a parameter corresponding to the first onboard diagnostic PID, wherein the current value of the parameter represents a state of the particular system;

perform a comparison to determine a difference between the current value of the parameter and a predetermined value corresponding to the first onboard diagnostic PID, wherein the predetermined value represents an upper bound threshold corresponding to the first onboard diagnostic PID, wherein the difference represents a health of the particular system of the vehicle; and display, at the display interface, a vehicle health record representing the health of the particular system of the vehicle via a graphic based on the particular system of the vehicle, wherein the graphic represents the particular system is within a desired health range when the current value of the parameter is below the predetermined value, and wherein the graphic represents the particular system requires maintenance when the current value of the parameter is above the predetermined value.

26. A non-transitory computer readable medium having stored therein instructions executable by one or more processors to cause a computing system to perform functions comprising:

receiving vehicle diagnostic information from an electronic control unit within a vehicle, wherein the vehicle diagnostic information includes one or more sets of parameters corresponding to onboard diagnostic parameter identifiers (PIDs), wherein the one or more sets includes a first set of parameters corresponding to a first onboard diagnostic PID;

identifying the first set of parameters corresponding to the first onboard diagnostic PID, wherein the first onboard diagnostic PID corresponds to a particular system of the vehicle;

determining, from within the first set of parameters, a current value of a parameter corresponding to the first onboard diagnostic PID, wherein the current value of the parameter represents a state of the particular system;

performing a comparison to determine a difference between the current value of the parameter and a predetermined value corresponding to the first onboard diagnostic PID, wherein the predetermined value represents an upper bound threshold corresponding to the first onboard diagnostic PID, wherein the difference represents a health of the particular system of the vehicle; and displaying, at a display interface, a vehicle health record representing the health of the particular system of the vehicle via a graphic based on the particular system of the vehicle, wherein the graphic represents the particular system is within a desired health range when the current value of the parameter is below the predetermined value, and wherein the graphic represents the particular system requires maintenance when the current value of the parameter is above the predetermined value.

\* \* \* \* \*